United States Patent [19]
Shore et al.

[11] 3,757,312
[45] Sept. 4, 1973

[54] GENERAL PURPOSE ASSOCIATIVE PROCESSOR

[75] Inventors: John E. Shore, Washington, D.C.; Frank A. Polkinghorn, Jr., Oxon Hill, Md.

[73] Assignee: The United States of America as represented by the Secretary of the Navy, Washington, D.C.

[22] Filed: Oct. 9, 1970

[21] Appl. No.: 79,415

[52] U.S. Cl. 340/173 AM, 340/172.5, 340/174 GA
[51] Int. Cl. .......... G11c 15/00
[58] Field of Search .......... 340/174 GA, 173 AM, 340/172.5; 235/168

[56] References Cited

UNITED STATES PATENTS

| | | | |
|---|---|---|---|
| 3,576,436 | 4/1971 | Lindquist | 340/173 AM |
| 3,644,904 | 2/1972 | Baker | 340/173 AM |
| 3,402,394 | 9/1968 | Koerner et al. | 340/173 AM |
| 3,483,528 | 12/1969 | Koerner | 340/173 AM |
| 3,576,436 | 4/1971 | Lindquist | 340/173 AM |
| 3,402,398 | 9/1968 | Koerner et al. | 340/173 AM |
| 3,533,085 | 10/1970 | Murphey | 340/173 AM |

*Primary Examiner*—Stanley M. Urynowicz, Jr.
*Attorney*—R. S. Sciascia, Arthur Branning, J. G. Murray and M. E. Crane

[57] ABSTRACT

A solid state associative chip memory system including an array of structurally identical elements each of which contains an integral number of bits. The system is independent of the length of each data word and the total number of words since any required word length may be obtained by horizontally connecting the proper number of associative chips and any processor size may be obtained by vertically connecting associative words. The system provides an array processor which has a distributed (in memory) logic that is capable of processing information while remaining in memory and is capable of simultaneous operations for solving problems in real time.

1 Claim, 20 Drawing Figures

INVENTORS
JOHN E. SHORE
FRANK A. POLKINGHORN, JR.
BY Melvin L. Crane AGENT
Arthur A. [illegible] ATTORNEY

FIG. 2

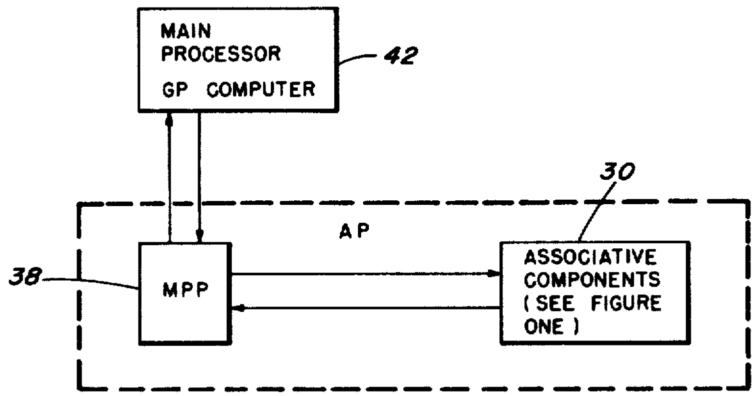

FIG. 4

| NO. | DESCRIPTION OF THE LINE | OCCURANCE |
|---|---|---|
| 1 | COMPLEMENT OF THE SDR (INPUT) | EVERY BIT |
| 2 | FROM COMPARAND | EVERY BIT |
| 3 | FROM SC1 | EVERY BIT |
| 4 | FROM SC2 | EVERY BIT |
| 5 | CONNECTION FROM READ BUS | ONCE PER CHIP |
| 6 | FLIP-FLOP OUTPUT WHEN READ BUS IS HIGH | EVERY BIT |
| 7 | CONNECTION FROM WRITE BUS | ONCE PER CHIP |
| 8 | CONNECTION FROM ADD BUS | ONCE PER CHIP |
| 9 | CARRY FROM BIT n − 1 | ONCE PER CHIP |
| 10 | CARRY TO BIT n + 1 | ONCE PER CHIP |
| 11 | SET ALL REMAINING RESPONSES IN SYLLABLE | ONCE PER CHIP |
| 12 | SET ALL REMAINING RESPONSES IN SYLLABLE | ONCE PER CHIP |
| 13 | RESPONSE LINE FROM MORE SIGNIFICANT BITS | ONCE PER CHIP |
| 14 | RESPONSE LINE OUTPUT | ONCE PER CHIP |
| 15 | MOR INPUT | EVERY BIT |
| 16 | CLOCK (NOT SHOWN) | ONCE PER CHIP |
| | POWER (NOT SHOWN) | ONCE PER CHIP |
| | GROUND (NOT SHOWN) | ONCE PER CHIP |

INVENTORS
JOHN E. SHORE
FRANK A. POLKINGHORN, JR.
BY AGENT
ATTORNEY

INVENTORS
JOHN E. SHORE
FRANK A. POLKINGHORN, JR.

BY AGENT
ATTORNEY

INVENTORS
JOHN E. SHORE
FRANK A. POLKINGHORN, JR.
BY AGENT
ATTORNEY

INVENTORS

JOHN E. SHORE
FRANK A. POLKINGHORN, JR.

BY AGENT

ATTORNEY

INVENTORS
JOHN E. SHORE
FRANK A. POLKINGHORN, JR.
BY AGENT
ATTORNEY

INVENTORS
JOHN E. SHORE
FRANK A. POLKINGHORN, JR.
BY AGENT
ATTORNEY d. LEAST SIGNIFICANT BIT

INVENTORS
JOHN E. SHORE
FRANK A. POLKINGHORN, JR.

BY AGENT

ATTORNEY a. THE MOST SIGNIFICANT BIT b. THE SECOND BIT c. THE LEAST SIGNIFICANT BIT

INVENTORS
JOHN E. SHORE
FRANK A. POLKINGHORN, JR.

BY AGENT

ATTORNEY

INVENTORS
JOHN E. SHORE
FRANK A. POLKINGHORN, JR.
BY
AGENT
ATTORNEY a. MOST SIGNIFICANT BIT b. SECOND MOST SIGNIFICANT BIT c. THIRD MOST SIGNIFICANT BIT

INVENTORS
JOHN E. SHORE
FRANK A. POLKINGHORN, JR.

BY AGENT

ATTORNEY

INVENTORS
JOHN E. SHORE
FRANK A. POLKINGHORN, JR.
BY
AGENT
ATTORNEY

FIG. 15

| NO. | DESCRIPTION OF LINE |
|---|---|
| 1 | MOR INPUT TO RS |
| 2 | COMP INPUT TO CHIP |
| 3 | SC1 INPUT TO CHIP |
| 4 | SC2 INPUT TO CHIP |
| 5 | SC1 INPUT TO RS |
| 6 | SC2 INPUT TO RS |
| 7 | WRITE INPUT TO CHIP |
| 8 | ADD INPUT TO CHIP |
| 9 | COMP INPUT TO RS |
| 10 | ASSOCIATIVE SEARCH LINE |
| 11 | MULTI-WRITE LINE |
| 12 | MULTI-ADD LINE |
| 14 | RESPONSE OUTPUT OF RS |
| 15 | MOR INPUT TO CHIP |
| 17 | READ LINE |
| 18 | READ BUS |
| 19 | ADD BUS |
| 20 | WRITE BUS |
| 21 | WORD-SLICE RESPONSE |
| 22 | CONVENTIONAL WRITE LINE |
| 23 | CONVENTIONAL ADD LINE |
| 24 | ADDRESS SELECT LINE |
| 25 | RESET RB LINE |

INVENTORS
JOHN E. SHORE
FRANK A. POLKINGHORN, JR.

BY AGENT
ATTORNEY

GENERAL PURPOSE ASSOCIATIVE PROCESSOR

STATEMENT OF GOVERNMENT INTEREST

The invention described herein may be manufactured and used by or for The Government of the United States of America for governmental purposes without the payment of any royalties thereon or therefor.

BACKGROUND OF THE INVENTION

Since the introduction of the modern general purpose computer, processing speeds have increased by several orders of magnitude. Most of the improvements have resulted from better hardware and better programming techniques. Only a small part is the result of modifications to the organization of the machine. Even today, general purpose computers on the market for the most part still follow the basic organization of the von Neumann machine and perform calculations sequentially.

Such organizational modifications that have been made for the most part involve an increase in parallel processing capability. These departures from the classic von Neumann organization have generally followed one of two basic paths. In one, several (von Neumann) general purpose computers are tied together into a multiprocessing system. In this type of configuration, different branches of one program (or several independent programs) are executed independently. That is, different multiprocessor elements execute different instructions on different data bases. It is this extremely free structure that limits the size of multiprocessing systems, as expressed by the number of individual processors. This is due both to the expense (each element is a general purpose computer) and to the software problem of tying many sophisticated processors together so freely.

There remain many general problems, both military and commercial, that cannot be treated with currently available sequential processors or multiprocessors. Examples include air traffic control, numerical weather forecasting through solution of the atmospheric equations, atomic reactor calculations, mapping and charting, complex pattern recognition, ocean surveillance, and signal processing. The inability to meet these real time processing requirements on a sequential machine relates to the intrinsic limitations of switching speeds, memory speeds, and signal propagation delays.

It is noted that all of the problems mentioned above have one thing in common. They require a processing system in which a large number of processing elements execute the same instruction on different data bases. This is the second path taken in departures from von Neumann machine organization. One way of describing the degree of parallelism in such a machine is by the size of the individual data bases. For example, in one type, each processing element works on a 2,048 word (64 bit) local memory. Clearly, overall processing capability reaches a maximum when each processing element works on a data base of only one word (assuming that the processing capability of each element remains constant).

One way of providing this "one on one" processing capability is through use of associative (or content addressable) memories and processors. Associative memories have been generally described as a collection of data storage elements which can be accessed in parallel on the basis of data content as opposed to conventional addressing techniques. In most configurations, the basic operation of such a device is the exact match search, in which all associative elements are simultaneously compared to a given word (the comparand) and "response store bits" are set to indicate which words in associative memory are equal to the comparand. A response resolution mechanism then supplies the control device with a list of addresses that have "responded." Usually, a mask register is used to inhibit portions of the comparand, thus permitting only certain bits to be used as the search criteria.

Extending the comparand to include the ability to use previously set response bits as criteria for additional searches, as well as adding to the basic hardware of the associative memory, permits a wide range of increased capability. Single or compound searches that might be implemented include:

| | |
|---|---|
| equal | not equal |
| less than | greater than |
| less than or equal | greater than or equal |
| maximum value | minimum value |
| between limits | not between limits |
| next higher | next lower |
| etc. | |

If arithmetic and multi-write circuitry are also included, operation such as write-on-match and add-on-match may also be made available.

An additional level of sophistication and processing capability is available through use of a variable instruction technique in which the search criteria for each syllable can be specified independently and simultaneously. (A syllable may be defined as a contiguous sequence of bits within a word.) Suppose, for example, one has a 48 bit associative machine divided (through hardware constraints) into six eight bit syllables. Then in one cycle one might search for all words having their first syllable equal to the first syllable of the comparand, their second syllable greater than the second syllable of the comparand, etc. Such a device may be called a fixed syllable, variable instruction associative processor which has been described in NRL Report 6,961, A Fast, Flexible, Highly Parallel Associative Processor by John E. Shore and Frank A. Polkinghorn, Jr.

SUMMARY OF THE INVENTION

The system of this invention includes an associative memory, its control registers and a Micro Programmed Processor (MPP) with flip flop memory to effectively drive the associative memory. The registers include the comparand (COMP), search control registers (SC1, SC2), the output buffer (AMOB), conventional address register (AMAR), the multi operation register (MOR) and the syllable definition register (SDR). The SDR allows redefinition of the syllable structure before each instruction. The processing is accomplished in a syllable parallel fashion with different search criteria for each syllable. This allows simple simultaneous processing in every syllable in memory, and, in limited cases multiple operations in the same syllable. These simple instructions can then be combined to form a macro-instruction in the MPP. Since the speed of each instruction is different, the timing is produced by a Clock Inhibit Network, which counts down a compiler produce period in order to optimize the efficiency of the system.

The basic circuit in this system comprises a powerful associative single bit cell which may be combined with an integral number of identical cells and implemented in Medium Scale Integration or Large Scale Integration. The basic functions of the cell are conventional read/write, comparison (greater than, less than, equal and don't care), add, multi-add and multi-write. By combining these cells in different syllables (via the SDR), additional functions can be created.

The Response Store section of the associative word utilizes for its memory function several cells as outliend above with additional external circuitry to perform slightly different functions than the non-Response Store bits. There are an arbitrary number of Response Bits and a single Response Resolution Bit (RRB).

The RRB is passed on to a Response Resolution Network (RRN) which is unique in two respects. First, it produces the address of the lowest addressed responder directly as a pointer back to the associative word as well as a pointer to a large non-associative auxiliary file. Second, the delay time is proportional to $\log_B(M)$ for a memory of M words, where B is most conveniently chosen to be a power of 2 that divides M. This technique is not only very fast but also inexpensive in terms of the number of gates required per word.

OBJECTS OF THE INVENTION

It is therefore an object of the present invention to provide an advanced parallel processing capability in the form of a general purpose associative processor that can solve many problems in real time.

Another object is to provide a system that has sufficient switching speeds, memory speeds and signal propagation relays to effectively solve various types of problems.

Still another object is to provide a computer system that operates upon data while in memory without first reading the data out of memory.

Yet another object is to provide a computer system which has the capacity to perform an operation on many data words simultaneously.

A further object is to provide a computer system which is independent of the length of each data word and the total number of words.

Another object is to provide a computer system in which syllable specifications are controlled by software in which syllables are allocated on a real time basis as a function of the data being processed.

While still another object is to facilitate a plurality of simultaneous operations in a specifically short time.

Other objects and advantages of the invention will become more fully apparent from the following description of the annexed drawing.

BRIEF DESCRIPTION OF THE DRAWINGS

FIG. 2 is a block diagram illustrating the relationship between a main processor (general practice computer) and the associative processor.

FIG. 4 illustrates a summary chart of the control lines for the associative chip.

FIG. 15 illustrates a summary chart for the Response store control lines.

DESCRIPTION OF THE DRAWINGS

Figure 1:
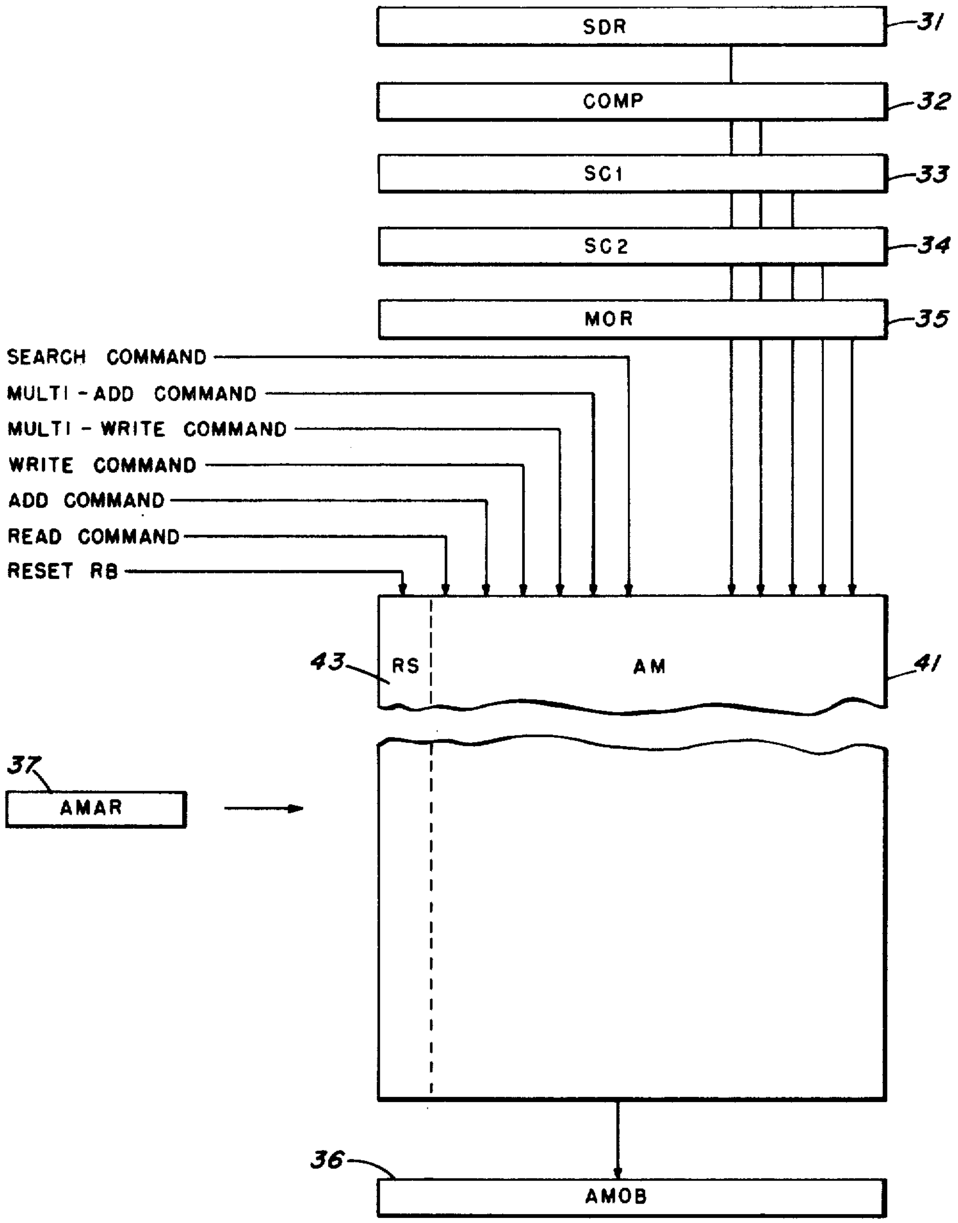
FIG. 1 is a simplified block diagram representing the various elements of the associative processor system.

Now referring to the drawings, there is shown in FIG. 1 the various elements of the associative processor for carrying out the functions of this invention. The associative processor (AP) 30 includes a Syllable Definition Register (SDR) 31, a Comparand (COMP) 32, a Search Command One (SC1) 33, a Search Command Two (SC2) 34, a Multi-Operation Register (MOR) 35, an Associative Memory Output Buffer (AMOB) 36, and an Associative Memory Address Register (AMAR) 37. These provide seven (flip flop) registers under the control of a Micro-Program Processor (MPP) 38, FIG. 2, that combines with the Associative Memory (AM) 41 to form the Associative Processor, AP. The inclusion of the MPP does not increase the associative capabilities of the AM since the seven registers illustrated in FIG. 1 could be directly under the control of the main processor 42. However, including the additional level of control represented by the MPP enables frequently used complex associative operations to proceed in parallel to the continuing operation of the main processor. In such a configuration, an associative macro-instruction passed to the MPP from the main processor will initiate a microprogram located in the MPP. Also, this configuration enables one to exploit the speed of the AP by operating the MPP-AM combination with a cycle time independent of that required by the main processor. The relationship described above is indicated by the block diagram in FIG. 2.

The key design element of the Associative Processor, AP, FIG. 1 is the integrated circuit chip which forms its primary component. Each chip contains a number of contiguous bits from the same word-slice. The AM 41 is constructed by horizontally and vertically "stacking" this basic chip. The Response Store (RS) section 43 is formed by adding external logic to the basic chip and "stacking" this combination.

The number of bits per chip, N, is a variable, as N increases, so does the number of gates and control lines per chip. The limit can be determined on purely technological grounds.

The Solid State Chip

Figure 3:
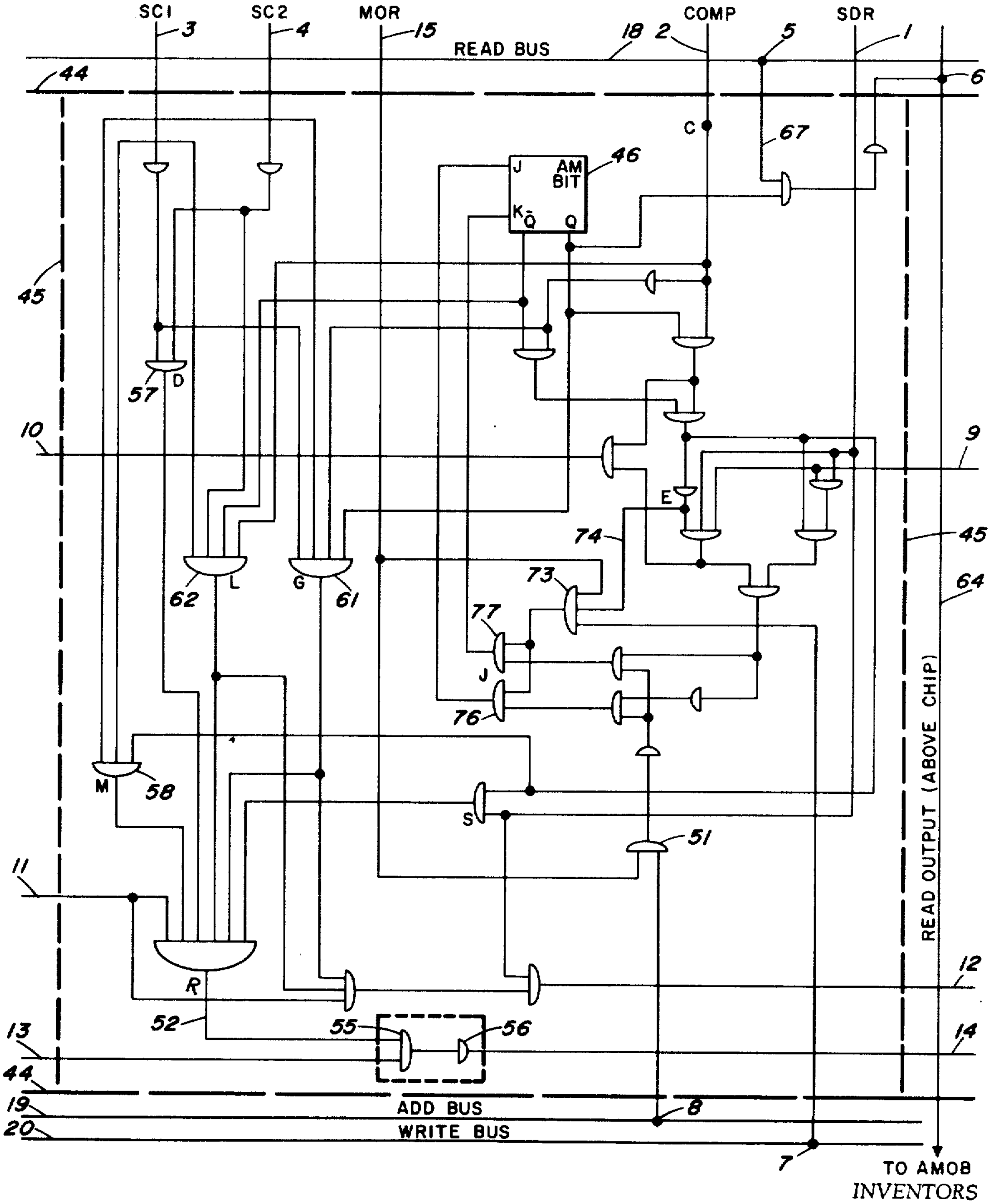
FIG. 3 illustrates the circuitry for one bit of a multibit associative chip.

The system illustrated presented requires 36N + 2 gates and 6N + 12 control lines per chip. Thus, a conveniently sized chip of four bits will contain 146 NAND gates and 38 control lines. A schematic of one bit in this associative chip is shown in FIG. 3 and the various control lines are summarized in FIG. 4. The clock, power, and ground lines are not included in FIG. 3 for simplification of the drawing and all gates are NAND gates.

It is likely that the circuit in FIG. 3 can be further minimized. Also, in terms of another canonical logic operation (NOR) or some technologically possible combination of operations, it may be possible to arrive at lower gate and control line requirements. Therefore, it is convenient to specify the chip design as a set of Boolean equations. Such a specification is given below.

In terms of the control lines described above and the internal lines of FIG. 3, the Boolean equations for the associative chip of FIG. 3 are as follows:

$6 = 5 \cdot Q$ $10 = 2 \cdot Q + 9 \cdot 1 \cdot (Q \oplus 2)$ $J = 8 \cdot 15 \cdot [(2 \oplus Q) \oplus (9 \cdot 1)] + 15 \cdot 7\ (Q \oplus 2)$ $K = 8 \cdot 15 \cdot [(2 \oplus Q) \oplus (9 \cdot 1)] + 15 \cdot 7\ (Q \oplus 2)$ $14 = 13 \cdot [A \cdot (\overline{Q \oplus 2}) + B + D \cdot (\bar{2} \cdot Q) + C \cdot (\bar{2} \cdot Q) + 1 \cdot (\overline{Q \oplus 2}) + \overline{11}]$ $12 = \overline{[D \cdot (2 \cdot Q) + C \cdot (2 \cdot Q) + 11] \cdot 1}$ In the above, $A = 3 \cdot 4$ $B = \bar{3} \cdot \bar{4}$ $C = 3 \cdot \bar{4}$ $D = \bar{3} \cdot 4$ Each of the flip flop registers and their operation will now be described below.

In the following, a "word-slice" refers to the contents exposed by an horizontal cross section through the right hand side of the AM of FIG. 1. Similarly, a "bit-slice" refers to the contents exposed by a vertical cross section through FIG. 1.

SYLLABLE DEFINITION REGISTER

The function of the syllable definition register (SDR) 31 is to indicate the intra-syllable limits for purposes of addition and of non-equal comparisons (less than; greater than). Therefore, the SDR should contain a "1" in the lowerest numbered (least significant) bit of each syllable.

There are several reasons for including this variable (or floating) syllable capability. First of all, since syllables can be allocated according to the requirements of the specific application, one is able to make efficient use of the AM word-slice length. Second, since the SDR is under software control, one can go a step further and allocate syllables on a real time basis as a function of the data being processed. Finally, as will be seen in later discussions, special purpose manipulation of the SDR results in a marked increase in the overall associative capability of the AP.

For many applications, a variable represented by one word in AM has many parameters associated with it. As a particular example, suppose a sixteen bit machine is being used and five parameters in each word have been stored according to the following:

bits 1 – 3: $P_1$,
bits 4 – 5: $P_2$,
bits 6 – 8: $P_3$,
bits 9 – 11: $P_4$
bits 12 – 13: $P_5$ Bits 14 –16 are taken up by the Response Store (RS) 43, the operation of which is described below. Bit positions are labelled from right to left as follows:

| 14 | 12 | 9 | 6 | 4 | 1 |
|---|---|---|---|---|---|
| RS | $P_5$ | $P_4$ | $P_3$ | $P_2$ | $P_1$ |

Realistic bit specifications would be longer and many other parameters should be included.

Addition and nonequal comparisons (less than; greater than) require indication of the intrasyllable limits. This is the function of the syllable definition register (SDR), which should contain a "1" in the lowest number (least significant) bit of each syllable. For the preceding example, the SDR would be loaded as follows:

| | | | | | | | | | | | | | | | |
|---|---|---|---|---|---|---|---|---|---|---|---|---|---|---|---|
| X | X | X | 0 | 1 | 0 | 0 | 1 | 0 | 0 | 1 | 0 | 1 | 0 | 0 | 1 |

The Comparand

The Comparand (COMP) 32 contains the reference word for an associative search. In addition, during a multi-add operation, it is the addend and during a multi-write operation it acts as the input buffer. The exact nature of each of these operations is contingent on the contents of the other control register which will be set forth later.

The Search Command Registers and the Associative Search Operation

When a search command is given (by raising a line from the MPP) every word in AM is simultaneously compared to the COMP. Each of these comparisons is performed in a bit parallel fashion. There are four basic types of searches, each of which can be specified for any sequence of bits (including a sequence of one). These are:

1. greater than the COMP
2. less than the COMP
3. exactly matching the COMP
4. don't care The selection of one of the above is determined, on a bit by bit basis, by the contents of the search control (SC) registers 33 and 34. The code for this specification is given as follows:

| SC1 | SC2 | Type of basic search |
|---|---|---|
| 0 | 1 | Greater than the COMP. |
| 1 | 0 | Less than the COMP. |
| 1 | 1 | Exact match to the COMP. |
| 0 | 0 | Anything will do (don't care). |

A contiguous series of either search control type 1 or type 2 carries the implication that the specified series of bits are to be considered as one value throughout AM for purposes of the search. In the event that such a series crosses an intrasyllable division, the SDR automatically splits it into two separate series. If a particular word in AM satisfies all criteria specified by the COMP, SC1, and SC2 the word-slice is said to "respond," and a bit is set in the Response store (RS) section of the word-slice.

In a particular search, requiring one or more matches in the RS section is equivalent to including the criteria of a previous search or series of searches. It is this capability that enables one to build complex search types (e.g. between limits) from the basic set.

The number of bits in RS is a hardware variable as far as the present system is concerned. While two bits will suffice to accommodate any length series of ANDed searches, each conditional on the results of the previous search, additional RS bits are required if one wishes to maintain a record of when (i.e. between which searches) each word-slice ceased to satisfy a continuing series of searches. Thus, the RS should be made long enough to record the longest expected series of the latter type. If only a count of the number of satisfied searches is required, this can be accomplished by utilizing a syllable within each word-slice.

As mentioned above, when a word-slice responds to a particular search, a bit is set in the RS section of that word-slice. The particular bit to be set is specified for each search by the occurrence of the Response Bit control register pattern shown as follows:

| | |
|---|---|
| COMP | 1 |
| SC1 | 0 |
| SC2 | 0 |

The intersection of this bit-slice with every word-slice defines the Response Bit (RB) for the search being performed. It is noted that this combination of a "1" in the COMP with a "don't care" specification would not otherwise be useful.

The extreme left-hand bit in RS is called the Response Resolution Bit (RRB). Its output is connected to the Response Resolution Network (RRN). The RRN is designed to supply the MPP with a list of addresses of those AM word-slices that have a "1" set in the RRB. Thus, whenever one is actually interested in working with those word-slices responding to a particular search one should specify the RRB as the Response Bit for that search.

In order to clarify these procedures, reference is made to the former example. Suppose that AM is filled with information as illustrated above. Suddenly one becomes interested in that set of AM words satisfying $$A < P_3 < B,$$
$$C < P_4 < D,$$
$$E < P_5 < F.$$

If, for example, $P_3$ and $P_4$ are spatial coordinates and $P_5$ is time, then this is equivalent to specifying a particular two-dimensional area and a specific time period. Suppose, in addition, that the code for $P_2$ has been constructed in such a way that all AM words of present interest will have a "1" in bit 5. For example, if $P_2$ were used to indicate aircraft type in an ATC application, bit 5 might distinguish between military and non-military traffic. In order to raise the associative search line to the AM the control registers are loaded as follows:

| | 16 | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|---|
| SDR | X | X | X | 0 | 1 | 0 | 0 | 1 | 0 | 0 | 1 | 0 | 1 | 0 | 0 | 1 |
| COMP | 0 | 0 | 1 | ← | F | ← | C | → | ← | B | → | 1 | X | X | X | X |
| SC1 | 0 | 0 | 0 | 1 | 1 | 0 | 0 | 0 | 1 | 1 | 1 | 1 | 0 | 0 | 0 | 0 |
| SC2 | 0 | 0 | 0 | 0 | 0 | 1 | 1 | 1 | 0 | 0 | 0 | 1 | 0 | 0 | 0 | 0 |
| MOR | X | X | X | X | X | X | X | X | X | X | X | X | X | X | X | X |

As a result, bit number 14 is set in every word with bit 5 equal to "1" and with $$P_3 < B,$$
and
$$P_4 < C,$$
$$P_5 < F.$$

In order to search again, the control registers are reloaded as follows:

| | 16 | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|---|
| SDR | X | X | X | 0 | 1 | 0 | 0 | 1 | 0 | 0 | 1 | 0 | 1 | 0 | 0 | 1 |
| COMP | 1 | 0 | 1 | E | → | ← | D | → | ← | A | → | X | X | X | X | X |
| SC1 | 0 | 0 | 1 | 0 | 0 | 1 | 1 | 1 | 0 | 0 | 0 | 0 | 0 | 0 | 0 | 0 |
| SC2 | 0 | 0 | 1 | 1 | 1 | 0 | 0 | 0 | 1 | 1 | 1 | 0 | 0 | 0 | 0 | 0 |
| MOR | X | X | X | X | X | X | X | X | X | X | X | X | X | X | X | X |

The search criterion that bit 14 be equal to "1" restricts the set of possible solutions to those words in AM that have already satisfied the search criteria defined above. Thus, as a result of the second search, bit number 16 (the RRB) is set in every word that satisfies the previous search and the criteria:

$$P_3 < A,$$
and
$$P_4 < D,$$
$$P_5 < E$$

This combination is equivalent to the original specification. The RRN now supplies the MPP with the addresses of the responding AM words. The total time required to set the RS according to the above criteria is only two AM cycle times *independent of AM size*) plus the time it takes to fill the COMP, SC1, and SC2 before each search. This can be reduced to one cycle time by doubly listing each parameter to allow simultaneous comparison of both the upper and lower limits at an obvious increase in hardware cost.

It is noted that only the "greater than" and "less than" search types are dependent on the contents of the SDR. The exact nature of this dependence is best explained in connection with the digital design of the associative chip as set forth below. However, the analysis of this dependence results in the addition of two basic search types: less than or equal; and greater than or equal; resulting in a total of six basic search types.

Multi-Operations and the Multi-Operation Register

The multi-write and multi-add operations are symmetric in two respects. First of all, when either is initiated, those bits in the COMP, SC1, and SC2 that correspond to the RS (bits 14–16 in the example set forth above) search the RS with the search specification code shown for the Response Store. The operation is then executed for those word-slices responding to this RS search. Thus, like the associative search, the two multi-operations can be conditioned on the results of any previous set of associative searches.

The second symmetry of the multi-operations concern the Multi-Operation Register (MOR) 35. A write or add operation for any word-slice involves that word-slice and portions of the COMP, in particular those bits of the COMP which have a "1" in the corresponding bit of the MOR. Those COMP bits with an "0" in the corresponding MOR bit are ignored during the multi-operation.

The search portion of either multi-operation does not result in the setting of a RS bit (the RB). This is because the RS search does not extract any additional information from the AM.

The Multi-Write

In most cases, the multi-write operation is used to copy certain portions of the COMP simultaneously into every word in AM that has satisfied a particular combination of previously executed searches. If a particular word-slice satisfies the RS search criteria, each bit of the COMP which has the corresponding MOR bit set to "1" is copied into the word in AM. Those bits in AM which correspond to bits in MOR set to "0" are left unaltered. This procedure includes the RS section of every word-slice.

Returning to the example above, suppose one wishes to reset $P_1$ to zero in all words selected by the searches described above. This is accomplished by setting the control registers as shown below and raising the multi-write line.

| | 16 | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|---|
| SDR | X | X | X | 0 | 1 | 0 | 0 | 1 | 0 | 0 | 1 | 0 | 1 | 0 | 0 | 1 |
| COMP | 1 | 0 | 0 | X | X | X | X | X | X | X | X | X | X | 0 | 0 | 0 |
| SC1 | 1 | 0 | 0 | 0 | 0 | 0 | 0 | 0 | 0 | 0 | 0 | 0 | 0 | 0 | 0 | 0 |
| SC2 | 1 | 0 | 0 | 0 | 0 | 0 | 0 | 0 | 0 | 0 | 0 | 0 | 0 | 0 | 0 | 0 |
| MOR | 0 | 0 | 0 | 0 | 0 | 0 | 0 | 0 | 0 | 0 | 0 | 0 | 0 | 1 | 1 | 1 |

Including the RS in the multi-write operation implements a convenient, one Cycle clear Response Store operation, as shown:

| | 16 | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|---|
| SDR | X | X | X | X | X | X | X | X | X | X | X | X | X | X | X | X |
| COMP | 0 | 0 | 0 | X | X | X | X | X | X | X | X | X | X | X | X | X |
| SC1 | 0 | 0 | 0 | X | X | X | X | X | X | X | X | X | X | X | X | X |
| SC2 | 0 | 0 | 0 | X | X | X | X | X | X | X | X | X | X | X | X | X |
| MOR | 1 | 1 | 1 | 0 | 0 | 0 | 0 | 0 | 0 | 0 | 0 | 0 | 0 | 0 | 0 | 0 |

The Multi-Add — When the multi-add line is raised, the COMP (masked by the MOR) is simultaneously added to each word responding to the RS search (the addition itself is bit parallel). Individual syllable integrity is maintained by operation of the SDR, which inhibits carry propagation across each intra syllable division. The addition does not include the RS.

Continuing the previous example, instead of performing the multiwrite described in the last section, one might decide to replace $P_1$ and $P_5$ according to the following:

$$P_1 + C_1 \rightarrow P_1$$

$$P_5 + C_5 \rightarrow P_5$$

That is, in all words selected as described above; where $C_1$ and $C_5$ are constants. This may be accomplished by loading the control registers as follows:

| | 16 | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|---|
| SDR | X | X | X | 0 | 1 | 0 | 0 | 1 | 0 | 0 | 1 | 0 | 1 | 0 | 0 | 1 |
| COMP | 1 | 0 | 0 | ←$C_5$ | —→ | X | X | X | X | X | X | X | X | ←— | -$C_1$- | —→ |
| SC1 | 1 | 0 | 0 | X | X | X | X | X | X | X | X | X | X | X | X | X |
| SC2 | 0 | 0 | 0 | 1 | 1 | 0 | 0 | 0 | 0 | 0 | 0 | 0 | 0 | 1 | 1 | 1 |

and raising the multiadd line.

In general, one can perform 2*s* complement integer arithmetic on a syllable-by-syllable basis (as defined by the SDR). If required, overflows can be detected by an algorithm similar to that used with a conventional 2*s* complement adder. In the AP this detection can be performed simultaneously for every syllable in every word-slice.

Conventionally Addressed Operations

The AM can also be accessed by means of the AMAR 37 and a conventional address selection network. When the read line is raised, that AM word-slice whose address is located in the AMAR is gated (in parallel) into the AMOB. When the write line is raised, the COMP is written into the AM word-slice whose address is located in the AMAR. Finally, when the add line is raised, the COMP is added (in parallel) to that AM word-slice whose address is located in the AMAR. In both the add and the write operation, the COMP is masked by the MOR as described above.

Simultaneous Operations

The AP has been designed so that many combinations of the operations described individually above can be performed simultaneously (from a programming point of view). Of the six individual operations (corresponding to the six lines into the AM) there are $$\binom{6}{2}=15$$

possible combinations of two operations. In order to perform two operations simultaneously the two corresponding lines are raised into the AM.

Defining each of the 15 combinations as one binary operation, one may state that every binary operation is possible, in the sense that unique and unambigous results are obtained when any two lines are raised simultaneously. Of course, not all of the binary operations are equally useful. In general, the most useful will be those binary operations which are a combination of two "orthogonal" single operations. Two operations may be said to be "orthogonal" if they are functionally unrelated, i.e. if the two have no effect on each other. The orthogonality relationships between the six single AM operations are expressed in matrix form as follows:

| | READ | ADD | MULTI-ADD | MULTI-WRITE | WRITE | SEARCH |
|---|---|---|---|---|---|---|
| READ | | 1 | 1 | 1 | 1 | 1 |
| ADD | 1 | | 1 | * | 0 | 1 |
| MULTI ADD | 1 | 1 | | 0 | * | 1 |
| MULTI-WRITE | 1 | * | 0 | | 1 | 1 |
| WRITE | 1 | 0 | * | 1 | | 1 |
| SEARCH | 1 | 1 | 1 | 1 | 1 | |

As shown, "1" implies orthogonality, "0" implies non-orthogonal, and "*" implies orthogonality if and only if the word-slice selected by the AMAR is not one of those responding to the RS search of the multi-operation. The matrix may be understood by applying the following principle: Single operations are of two types, those that change the (non RS) contents of AM and those that do not. If the contents of a word-slice are to be change (as a write or add), they change only on the trailing edge of the next clock pulse. Operations that do not change the contents operate on the contents as they are before the next clock pulse. For example, the read and write are orthogonal. At the end of the read/write binary operation (i.e. after the next clock pulse) the COMP will have been written into the selected word-slice and the AMOB will contain the contents of the word-slice as they were before the COMP displaced them. In this manner, one sees that the only operator combinations which are not orthogonal are those in which both operations change the contents of the same word-slice.

This principle is reflected above in the matrix shown. The only pairs that are not orthogonal are those that attempt both to write and to add into the same word-slice. Later, it will be clear that the result of such an attempt will always be the logical OR of the COMP and the arithmetic sum of the COMP and the selected word-slice. As such, it is still a perfectly valid, if seldom useful, operation.

From the above matrix, it can be seen that the associative search is orthogonal to both multi-operations. The results of the two possible binary operations are slightly different from what one might expect from consideration of the individual operations. This change has been incorporated into the system so that the two operations (search/multi-write and search/multi-add) will be more useful. As set forth above, when executed individually, the two multi-operations select word-slices on the basis of their response to the RS search. When either of these milti-operations is part of a binary operation that includes the associative search, this procedure is modified so that word-slices are selected (for the add or write) on the basis of their response to the associative search. If a RB has been specified as set forth above in the control pattern, this bit will be set by the binary operation, just as described above in the discussion on the SC registers and the Associative search operation. As a result of this modification, the two binary operations can be used to replace the often used sequence of their component operations. For example, the sequence comprised of the search Code shown above followed by the multi-write Code shown above can be replaced by one simultaneous operation. For raising both the associative search and the multi-write lines, the registers are loaded as follows:

<table>
<tr><th></th><th>16</th><th>15</th><th>14</th><th>13</th><th>12</th><th>11</th><th>10</th><th>9</th><th>8</th><th>7</th><th>6</th><th>5</th><th>4</th><th>3</th><th>2</th><th>1</th></tr>
<tr><td>SDR</td><td>X</td><td>X</td><td>X</td><td>0</td><td>1</td><td>0</td><td>0</td><td>1</td><td>0</td><td>0</td><td>1</td><td>0</td><td>1</td><td>0</td><td>0</td><td>1</td></tr>
<tr><td>COMP</td><td>1</td><td>0</td><td>1</td><td colspan="2">←—E—→</td><td colspan="3">←—D—→</td><td colspan="3">←—A—→</td><td>X</td><td>X</td><td>0</td><td>0</td><td>0</td></tr>
<tr><td>SC1</td><td>0</td><td>0</td><td>1</td><td>0</td><td>0</td><td>1</td><td>1</td><td>1</td><td>0</td><td>0</td><td>0</td><td>0</td><td>0</td><td>0</td><td>0</td><td>0</td></tr>
<tr><td>SC2</td><td>0</td><td>0</td><td>1</td><td>1</td><td>1</td><td>0</td><td>0</td><td>0</td><td>1</td><td>1</td><td>1</td><td>0</td><td>0</td><td>0</td><td>0</td><td>0</td></tr>
<tr><td>MOR</td><td>0</td><td>0</td><td>0</td><td>0</td><td>0</td><td>0</td><td>0</td><td>0</td><td>0</td><td>0</td><td>0</td><td>0</td><td>0</td><td>1</td><td>1</td><td>1</td></tr>
</table>

Suppose a binary operation is composed of the two single operations $0_1$ and $0_2$, which normally execute in times $t_1$ and $t_2$, respectively. It will be shown later that the binary operation will require at least as much time as the larger of $t_1$ or $t_2$, but never as much as five gate delays more than this. Therefore, the inclusion of binary operations gives an additional processing speed advantage to the AP.

An analysis similar to the above can be carried out for all combinations of three primary operations. In general, there are a total of, $$\sum_{n=0}^{n=6}\binom{6}{n}=2^6$$

possible simultaneous AM operations of any number that can be arrived at by the above procedure. This suggests that one six bit syllable in each instruction of the MPP be reserved as an AM instruction code. The output of the corresponding flip flops of the MPP instruction register could be connected directly to the AM control lines. Other micro-program syllables will specify (directly or indirectly) the control register contents for that AM instruction, etc.

Complex Arithmetic Operations

The flexibility of the AP will be greatly increased by making complex arithmetic and logical operations available as stored microprograms in the MPP. In order to illustrate this capability, the following four examples are set forth.

Logical Operations

The three most often used logical operations — AND, OR, and EXCLUSIVE OR — are easily implemented as AP operations by proper manipulation of the control registers.

If *A* and *B* are two binary numbers and one desires to replace *B* according to

*A* OR *B* → *B*, one may proceed as follows: For each bit in A, if that bit equals "1," this value is written into the corresponding bit in B. If a bit in A equals "0," the corresponding bit in B is left unaltered. This procedure modifies B so that it is now equal to the logical OR of A and B. If both the COMP and the MOR are loaded with A and then perform a multi-write, those word-slices selected by the RS search are modified to become the logical OR of the COMP and the word-slice. To take a particular example, let

*A* = 110010 the control registers are loaded and the multi-write line is raised by loading the control registers as follows:

| | 16 | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|---|
| SDR | X | X | X | X | X | X | X | X | X | X | X | X | X | X | X | X |
| COMP | | | | X | X | X | X | X | X | X | 1 | 1 | 0 | 0 | 1 | 0 |
| SC1 | | | | X | X | X | X | X | X | X | X | X | X | X | X | X |
| SC2 | | | | X | X | X | X | X | X | X | X | X | X | X | X | X |
| MOR | 0 | 0 | 0 | 0 | 0 | 0 | 0 | 0 | 0 | 0 | 1 | 1 | 0 | 0 | 1 | 0 |

As a result, the last six bits of each word-slice selected by the RS search now represents the logical OR of *A* and their previous contents. The RS search criteria have been left blank as shown to indicate that the word-slices can be selected for the OR operation according to any specification.

Continuing the above example, suppose it is desired to replace B according to

*A* AND *B* → *B*.

One may proceed as follows: For each bit in A that equals "0," this value is written into the corresponding bit in B. For those bits in A that equal "1," the corresponding bit in *B* is left unaltered. This procedure modifies *B* so that it represents the logical AND of *A* and *B*. This can be accomplished in the AP by loading the COMP with A, loading the MOR with the bit-by-bit complement of A, and raising the multi-write line as follows:

| | 16 | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|---|
| SDR | X | X | X | X | X | X | X | X | X | X | X | X | X | X | X | X |
| COMP | | | | X | X | X | X | X | X | X | 1 | 1 | 0 | 0 | 1 | 0 |
| SC1 | | | | X | X | X | X | X | X | X | X | X | X | X | X | X |
| SC2 | | | | | X | X | X | X | X | X | X | X | X | X | X | X |
| MOR | 0 | 0 | 0 | 0 | 0 | 0 | 0 | 0 | 0 | 0 | 0 | 0 | 1 | 1 | 0 | 1 |

As a result, the last six bits of each word-slice selected by the RS search represents the logical AND of A and their previous contents.

Finally, suppose it is desired to replace B according to

A EXCLUSIVE OR *B* → *B*.

Since, for any two bits, their EXCLUSIVE OR is simply the sum of the two bits, this logical operation may be accomplished by loading the control registers as follows:

| | 16 | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|---|
| SDR | X | X | X | X | X | X | X | X | X | X | 1 | 1 | 1 | 1 | 1 | 1 |
| COMP | | | | X | X | X | X | X | X | X | 1 | 1 | 0 | 0 | 1 | 0 |
| SC1 | | | | X | X | X | X | X | X | X | X | X | X | X | X | X |
| SC2 | | | | X | X | X | X | X | X | X | X | X | X | X | X | X |
| MOR | 0 | 0 | 0 | 0 | 0 | 0 | 0 | 0 | 0 | 0 | 1 | 1 | 1 | 1 | 1 | 1 |

and raising the multi-add line. Note that the SDR specification results in the inhibition of all carries between bit-slices. As a result, the last six bits of each word-slice selected by the RS search now represents the logical EXCLUSIVE OR of A and their previous contents. It is noted that since both the AND and the OR involve an AM write operation, they may be performed simultaneously on different syllables, specifying each syllable according to the above.

Multiplication of All AM Words by the Comparand

Figure 6:
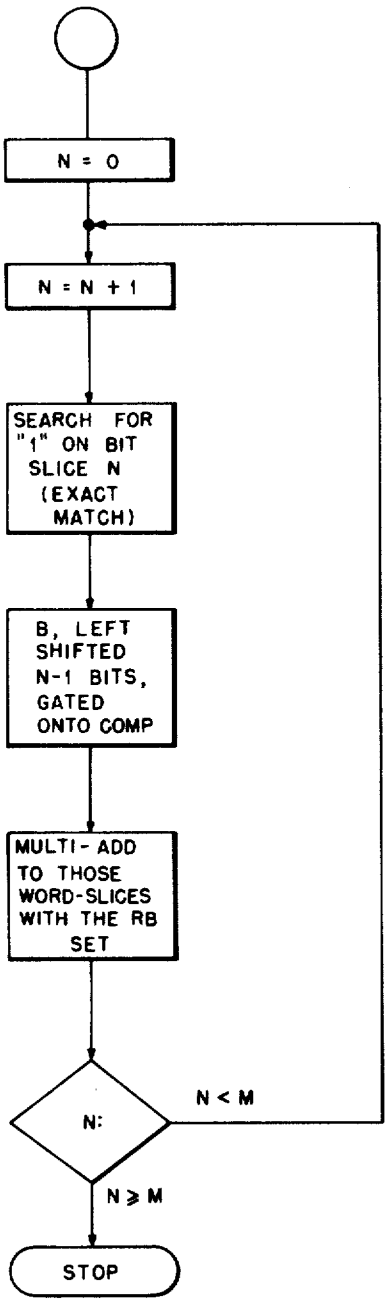
FIG. 6 is an algorithm flow chart for the multiplication of all associative memory words in the comparand.

This operation is based on the algorithm flowcharted in FIG. 6. Since all multi-adds can be conditioned on the results of any combination of previous searches this capability is already built into the multiplication (specifically, at operations 3 and 5 of FIG. 1). This algorithm will work for multipliers that are non-zero in one syllable only (there is no preferred syllable).

Addition of Two Syllables Within Every Word

This operation is based on the fact that the addition of two n bit words, A and B, may be performed in a serial fashion by expressing one word in the form $$A=\sum_{i=0}^{n-1} C_i 2^i$$

and then adding $A$ to $B$ on a term-by-term basis:

$$A+B=B+\sum_{i=0}^{n-1} C_i 2^i$$

Suppose it is desired to add the syllable of bits 3–5 to the syllable of bits 8–12 within every word-slice of AM. As the first step, the registers are loaded as follows:

1←B→1 (bits 12–8) 1←A→1 (bits 5–3)

| | 16 | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|---|
| SDR | X | X | X | X | 0 | 0 | 0 | 0 | 1 | X | X | 0 | 0 | 1 | X | X |
| COMP | X | X | X | X | 0 | 0 | 0 | 0 | 1 | X | X | X | X | 1 | X | X |
| SC1 | 0 | 0 | 0 | 0 | 0 | 0 | 0 | 0 | 0 | 0 | 0 | 0 | 0 | 1 | 0 | 0 |
| SC2 | 0 | 0 | 0 | 0 | 0 | 0 | 0 | 0 | 0 | 0 | 0 | 0 | 0 | 1 | 0 | 0 |
| MOR | 0 | 0 | 0 | 0 | 1 | 1 | 1 | 1 | 1 | 0 | 0 | 0 | 0 | 0 | 0 | 0 |

and both the associative search and the multi-add lines are raised. For each word-slice this operation adds a "1" to B if A has a "1" in its least significant bit. Next, the registers are loaded as follows:

1←B→1 (bits 12–8) 1←A→1 (bits 5–3)

| | 16 | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|---|
| SDR | X | X | X | X | 0 | 0 | 0 | 0 | 1 | X | X | 0 | 0 | 1 | X | X |
| COMP | X | X | X | X | 0 | 0 | 0 | 1 | 0 | X | X | X | 1 | X | X | X |
| SC1 | 0 | 0 | 0 | 0 | 0 | 0 | 0 | 0 | 0 | 0 | 0 | 0 | 1 | 0 | 0 | 0 |
| SC2 | 0 | 0 | 0 | 0 | 0 | 0 | 0 | 0 | 0 | 0 | 0 | 0 | 1 | 0 | 0 | 0 |
| MOR | 0 | 0 | 0 | 0 | 1 | 1 | 1 | 1 | 1 | 0 | 0 | 0 | 0 | 0 | 0 | 0 |

and the operation is repeated. This time, a "10" (binary) is added to B if A has a "1" in its second bit. The procedure is iterated for each bit in A. This completes the addition according to the algorithm described above.

It is noted that adding two syllables and storing their sum in a third syllable ( $A + B \rightarrow C$ ) can be easily accomplished by writing zeros into $C$, adding $A$ to $C$, as above, and then adding $B$ to $C$. Since, throughout, it may have been required that a RS bit be set (e.g. bit 14) this entire procedure is word-slice selective according to the results of previous searches.

Multiplication of Two Syllables Within Every Word

The algorithms of the previous two sections can be combined, enabling one to multiply two syllables together and store their product in a third syllable ($A \cdot B \rightarrow C$). Specifically, operation 5 in FIG. 6 is replaced by the algorithm of the last section. The entire procedure may be described as follows: To begin with, zeros are written into syllable $C$. The lowest order bit-slice of syllable $B$ is copied into a RS bit-slice (by performing an exact match search with a "1" in the COMP bit corresponding to the lowest order bit-slice of $B$). Syllable $A$ is added to $C$ (as above) in every word with the RB set. Next, the second lowest order bit-slice of syllable B is copied into the RS bit-slice. Syllable A, left shifted by one bit, is added to C in every word with the RB set. Left shifting A by one bit is accomplished, virtually, merely by displacing by one bit the correspondence between bits in A and C as specified in the algorithm. Specifically, the sum of A (left shifted by one bit) and B is given by $$A \text{ (left shifted one)} + B = B + \sum_{i=0}^{n-1} C_{i-1} 2^{i-1} (C_{-1}=0)$$

shown above for the first step, the correspondence will be between bit-slice 3 and bit-slice 9, instead of between 3 and 8 as shown for the unshifted example.

As in all of the AP operations that have been described, perhaps the most significant advantage lies in the fact that their execution times are all independent of AM size. That is, whether only one set, is multiplied or many thousands of sets of syllables together bears no relation to the operation time. In addition, the operations involved simultaneous logical word-slice selection, permitting operation only on those words that satisfy a given set of criteria. This flexible logic capability is available without any penalty in execution time.

It is noted that the logical operations described above can also be performed between syllables within the same word-slice by a method analogous to that of inter-syllable addition. Adding these to the other intersyllable operations described above, a set of operation are obtained that actually result in a small processor within every word, thereby giving the AP unprecedented logical and computational power.

Addition

Figure 5:
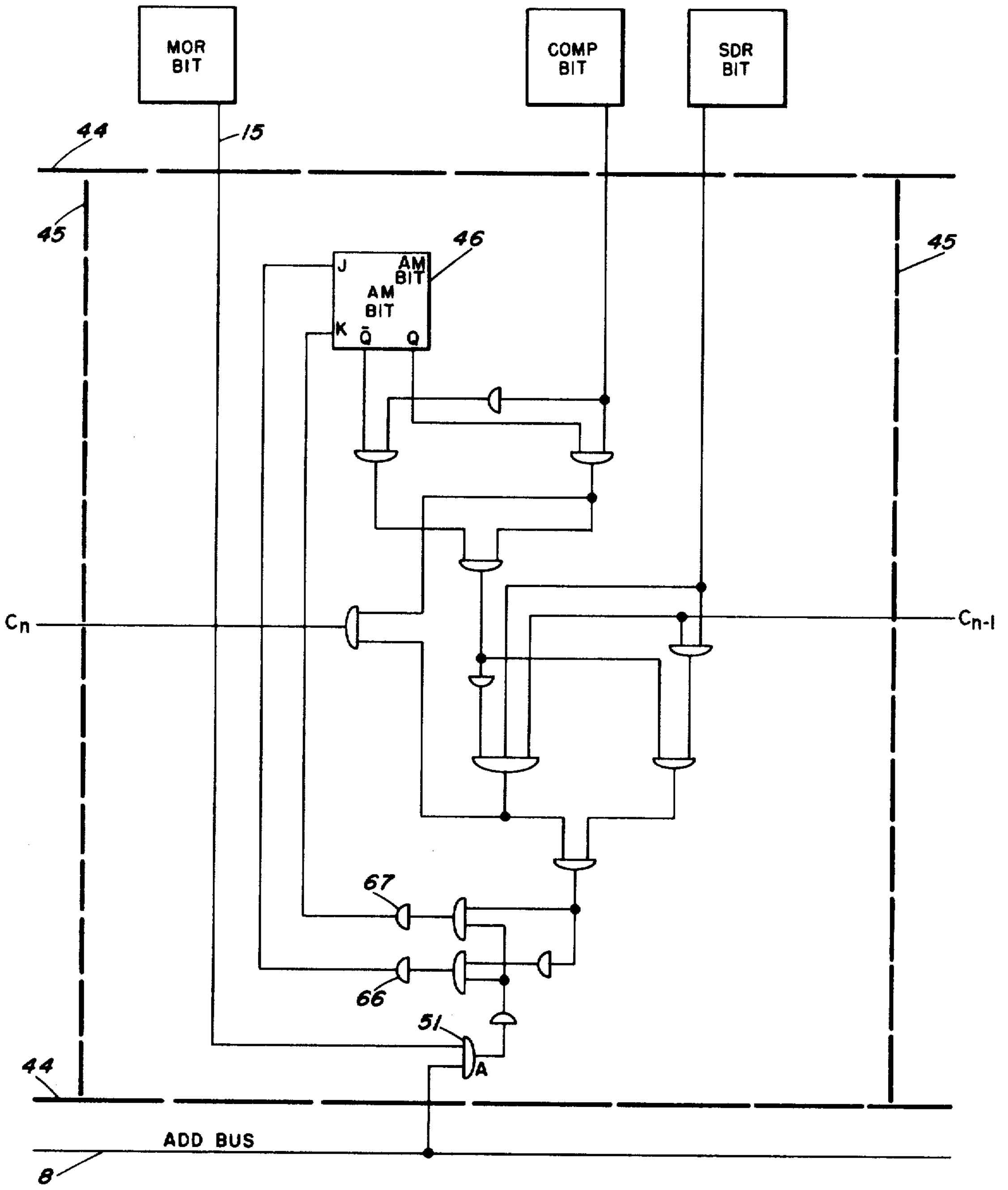
FIG. 5 illustrates a schematic of the addition circuit included in the circuitry of FIG. 3.

A NAND logic implementation of the addition scheme is depicted in FIG. 5. The horizontal dashed lines 44 represent limits of the chip. The heavy dashed vertical lines 45 represent the division of the chip into individual bits. Only one bit is shown in FIG. 5. The extreme left and right bit division lines become chip limits as well, with the width in bits to be determined as discussed above.

The square box 46 within the chip represents a J-K clocked flip flop (six (6) gates have been allowed for this flip flop). The truth table requirements for this flip flop are given as follows:

| J | 0 | 1 | 0 | 1 |
|---|---|---|---|---|
| K | 0 | 1 | 1 | 0 |
| $Q_{n+1}$ | $Q_n$ | $\bar{Q}_n$ | 0 | 1 |

The states J, K, $Q_n$, and $\bar{Q}_n$ (output and its complement) are states at the leading edge of the clock pulse. $Q_n$ changes to $Q_{n+1}$ at the trailing edge of the clock pulse. $Q_{n+1}$ remains unchanged at least until the trailing edge of the next clock pulse. The use of a clocked flip flop eliminates all race-time problems and permits one to include so many functions on one chip. Operationally, race-time problems are eliminated if one makes such that the next clock pulse after the initiation of an operation does not come before all J-K inputs have reached a steady state. This procedure may be compared to that of measuring the water level in a complex plumbing system. After opening or closing a set of valves that are part of a system, level ambiguity is eliminated if one does not make the measurement until enough time has elapsed for the water to "reach its natural level."

Addition is keyed to the state of the add bus line 8. The bus will be high if this word-slice has been selected for addition (either by conventional addressing or by response to the RS search of the multi-add operation). If the add bus is high, the COMP (masked by the MOR) is added in a bit parallel fashion to the AM word-slice involved. The input 15 from the MOR inhibits the add bus input unless the MOR bit is "1," at point A in FIG. 5 as required by the multi-operation register. The key to the add operation is the logical EXCLUSIVE OR:

$$a \oplus b = a \cdot \bar{b} + \bar{a} \cdot b.$$

If $a_n$ and $b_n$ are the contents of the nth bit in the COMP and AM word-slice, respectively, let $s_n$ be the contents of this bit in AM after the next clock pulse. Then, $$s_n = (a_n \oplus b_n) \oplus c_{n-1},$$

where $c_{n-1}$ is the carry from bit $n-1$. The carry (from bit n to bit $n+1$) is given by $$c_n = a_n \cdot b_n + c_{n-1} \cdot (a_n \oplus b_n).$$

A truth table for all values of $a_n$, $b_n$, and $c_{n-1}$ is as follows:

| $a_n$ | $b_n$ | $c_{n-1}$ | $s_n$ | $c_n$ |
|---|---|---|---|---|
| 0 | 0 | 0 | 0 | 0 |
| 1 | 0 | 0 | 1 | 0 |
| 1 | 1 | 0 | 0 | 1 |
| 1 | 1 | 1 | 1 | 1 |
| 0 | 1 | 0 | 1 | 0 |
| 0 | 1 | 1 | 0 | 1 |
| 0 | 0 | 1 | 1 | 0 |
| 1 | 0 | 1 | 0 | 1 |

It may be verified that the circuit in FIG. 5 satisfies this truth table if the add bus 8 and the MOR input 15 are both high at gate 51.

Recalling that the SDR contains a "1" in the least significant bit of each syllable, one sees that the SDR acts to inhibit the propagation of a carry from the end of one syllable to the beginning of the next. Consequently, any syllable overflow will result in loss of the most significant bits.

The Associative Search

Each type of associative search is performed in a bit parallel manner. The "exact match" and "don't care" searches are bit-wise independent, i.e. for each bit the search depends on the contents of that bit only. The "greater" and "less" a search are similar to the addition (see above) in that the outcome of the search depends to some extent on the contents of the other bits in a syllable. (Addition depends on the less significant bits. These searches depend on the more significant bits.)

Referring to the one bit schematic in FIGS. 3 and 5 (FIG. 5 corresponds approximately to the upper right hand corner of FIG. 3), the state of the line marked R (bottom left) indicates the search response of this bit. If R is high, this bit satisfies its particular search criterion. If R is low, the criterion has not been met. The response of the previous bit (the one on the left) is connected to input line 13. Clearly, line 14 will be high if and only if both line 13 and R (response of this bit) are high. If these conditions are not satisfied, and line 14 is low, every such line 14 in bits standing to the right will be forced to the low state. Hence, line 14 from bit one of the word-slice will be high if and only if every bit in the word-slice has satisfied its search criterion.

To avoid unnecessary gate delays, the two gates 55 and 56 near R that are surrounded by dotted lines should be included only in the extreme right hand (least significant) bit of each chip. If each chip is to contain N bits, then gate 55 within the dotted box would be a (N + 1) -input NAND gate, one input for every line 52 in the chip plus one from output line 14 of the previous chip (input line 13 of this chip).

The "Don't Care" Search

If the "don't care" criterion has been specified, the output of gate D or 57 will be in the low state. (See FIG. 3). Following the line down one sees that this condition will force line 52 high, as required.

The Exact Match Search

Since the method of addition involves the bit-wise logical EXCLUSIVE OR of the COMP and AM, it is advantageous to make as much use of this logical function as possible. If $A$ and $B$ are two single bit binary numbers, it is noted that $A \oplus B$ is zero if and only if $A = B$. Thus, $\overline{A \oplus B} = 1$ if and only if $A = B$. In FIG. 3 the state of point E corresponds to the EXCLUSIVE OR of the COMP and the bit under consideration. Tracing all inputs to gate 58 at $m$ (bottom left), one sees that if the complement of the EXCLUSIVE OR is high and if the exact match code has been specified, then the output of gate 58 will be low and 52 will be forced high, as required.

Search for Larger Elements

Determining whether an AM syllable is larger than the corresponding syllable in the COMP may be accomplished as follows: one looks first at the most significant bit of the syllable in AM. If this bit is larger than the corresponding bit in the COMP, one knows that the search has been successful and that the remaining bits of the syllable can be disregarded. On the other hand, if the bit in the COMP is larger, then one already knows that the syllable does not satisfy the search. If the two bits are equal, the procedure for the next most significant bit, etc. must be repeated. If every bit is equal, then the two syllables are equal and the AM syllable does not satisfy the search since it is not greater than the corresponding syllable in the COMP.

Figure 7:
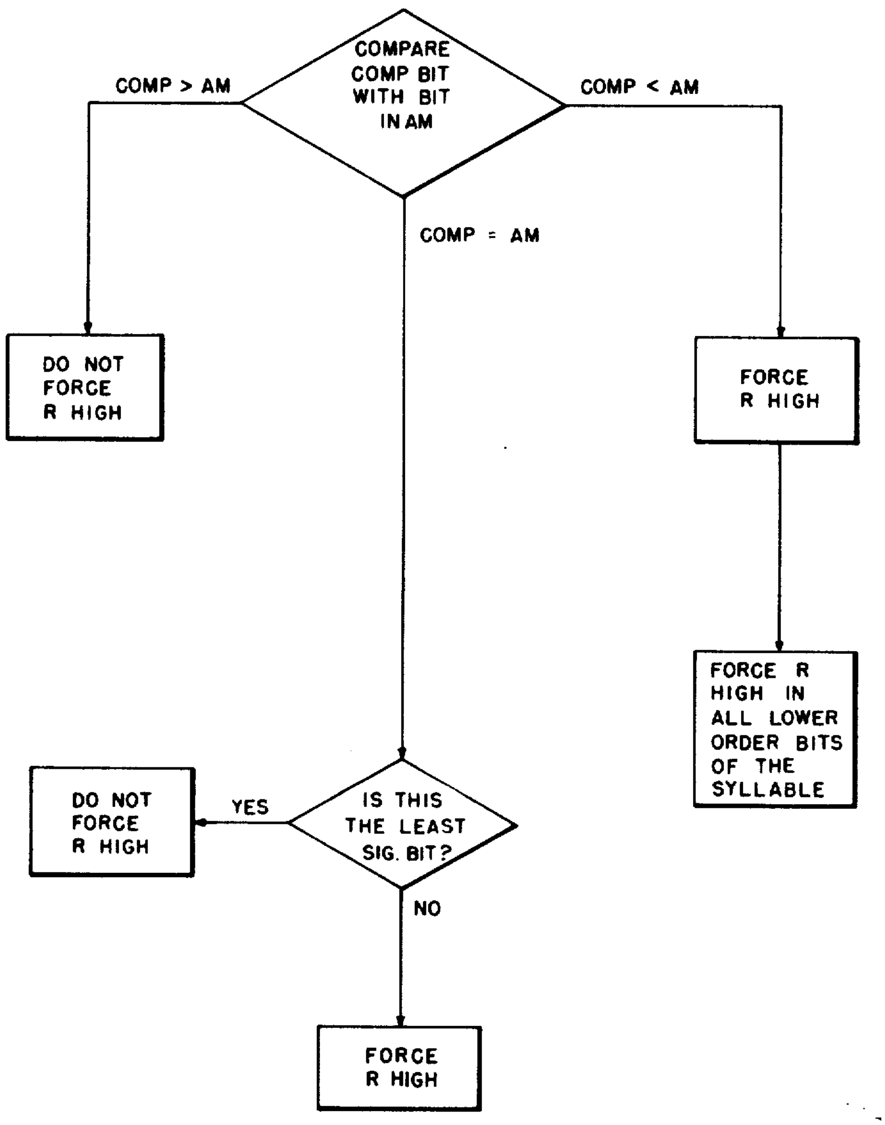
FIG. 7 is an algorithm flow chart for "greater than" searches.

The algorithm used in the associative chip is derived from the above, with modifications that enable the comparison to be made in a bit parallel manner. Thus, the algorithm flowcharted in FIG. 7 is executed simultaneously in every bit. This algorithm makes use of the above procedure and the fact that if R remains low in only one bit the entire word-slice will not satisfy the search.

In order to implement this algorithm one again makes use of the following: If A and B are both single bit binary numbers it is noted that $$\overline{A \cdot \overline{B}} = 0 \text{ if } A > B$$

$$= 1 \text{ otherwise .}$$

The output of gate 61 at G in FIG. 3 is equivalent to this function with $A = AM$ bit and $B =$ COMP bit, if a "greater than" search code has been specified for this bit. Following the line down one sees that if the output of gate 61 is low, R is forced high, as required. In addition, unless this is the least significant bit of the syllable (indicated by input line 1, the SDR), output line 12 is forced low. Output line 12 is connected to input line 11 of the next bit. If line 11 is low then R is forced high. Output line 12 is again forced low if this is not the least significant bit of the syllable in question. This completes the right hand branch of FIG. 7. Also, if the AM bit and COMP bit are equal, R is forced high unless the AM bit is the least significant of the syllable (see point S). Finally, one sees that if $A<B$ no action is taken and R stays low (unless a more significant bit has satisfied $A>B$). In this manner each branch of the flowchart in FIG. 7 is satisfied.

Search for Smaller Elements

The procedure used to search for syllables in AM smaller than the corresponding syllable in the COMP is exactly symmetric to that of the search for larger syllables. Thus, in FIG. 7, the left and right hand branches are simply reversed. Likewise, the implementation makes use of the fact that $$\overline{\overline{A} \cdot B} = 0 \text{ if } A < B$$

$$1 \text{ otherwise,}$$

where, again, A is an AM bit and B is the corresponding COMP bit. The output of gate 62 at L is low if this function is zero and if the "less than" code has been specified for this bit. Tracing the output of gate 62 we see that R is forced high if this output is low, as required.

The SDR and Its Use in the Associative Search

A complete understanding of the operation of the associative chip can lead to many sophisticated programming techniques through careful manipulation of the five control registers. These techniques can be used to increase the flexibility of the AP.

For example, suppose a parameter of interest normally will require not more than M bits. Then reserve M +1 bits for this parameter (by means of the SDR) but use only the M most significant bit of the syllable. Specifically, suppose one reserves bits 6 – 12 (inclusive) for a six bit parameter and store the parameter in bits 7 – 12. Now if one wishes to search for all values less than or equal to a particular value, this may be accomplished by the following control register which will set bit 14 of responding word-slices.

| | 16 | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|---|
| SDR | X | X | X | X | 0 | 0 | 0 | 0 | 0 | 0 | 1 | X | X | X | X | X |
| COMP | 0 | 0 | 1 | X | ← | Val | ue | — | — | → | X | X | X | X | X | X |
| SC1 | 0 | 0 | 0 | 0 | 1 | 1 | 1 | 1 | 1 | 1 | 0 | 0 | 0 | 0 | 0 | 0 |
| SC2 | 0 | 0 | 0 | 0 | 0 | 0 | 0 | 0 | 0 | 0 | 0 | 0 | 0 | 0 | 0 | 0 |

If one becomes interested in a strict "less than" search this may be accomplished by replacing bit 7 of the SDR with a "1." Clearly, one can similarly introduce the "greater than or equal to" search. In general, if one extra bit is reserved for every syllable, one can consider these two new searches as part of the basic set. Distinguishing between a "less than" and a "less than or equal to" or between a "greater than" and a "greater than or equal to" is accomplished through manipulation of the SDR.

Associative Memory Read

AM read operations are controlled by the read bus 18 of each word-slice. The read bus 18 is connected to the chip through input line 5. If the read bus is high, the output 6 of each AM bit is connected to read output line 64. External to each bit, output line 6 is connected to the bit-slice read line 64. Each bit in the bit-slice is connected in parallel to this line, which terminates at the bottom of the AM as an input to one bit of the AMOB. When the read line to the AM is raised, the read bus of that word-slice specified by the AMAR is raised and this word-slice is written in parallel into the AMOB (See FIG. 1).

The Associative Memory Write

AM write operations are controlled by the write bus 61 of each word slice. From the point of view of the associative chip, it does not matter whether the write command is initiated by a conventional write or a multi-write.

The write bus of a particular word-slice is connected to each chip through input line 7. If this line is raised, each bit executes the following algorithm: Suppose A and B are two single bit binary locations and one wishes to write the contents of $B$ into $A$. Recalling that $A \oplus B = 1$ if and only if $A \neq B$, we may use the result of this operation (which is in the chip already) to write B into A by complementing $A$ if $A \neq B$, otherwise doing nothing. Thus, if the write bus 71 is high and the corresponding MOR bit on gate 73 is "1" the COMP bit is written into the AM bit (the change, if any, will occur on the trailing edge of the next clock pulse). In FIG. 3, the circuit implementation may be verified by tracing the input lines 7 and 15 as well as the line 74 from point E through gate 73. The J-K input code is given as follows:

| J | 0 | 1 | 0 | 1 |
|---|---|---|---|---|
| K | 0 | 1 | 1 | 0 |
| $Q_{n+1}$ | $Q_n$ | $\overline{Q}_n$ | 0 | 1 |

Simultaneous Operations

As mentioned in the discussion on simultaneous operations above, each of the fifteen binary operations is possible, in the sense that unique and unambiguous results are obtained when any two lines are raised simultaneously. It can be seen that this fact derives from use of the clocked J-K flip flop as set forth in the section on addition.

The relationships described by the Binary Operation Orthogonality Matrix, shown above, derive directly from the digital design of the associative chip (FIG. 3). For each pair of single operations that are said to be orthogonal, the data paths followed within the associative chip are completely independent. For those operations which are not orthogonal, the individual data paths interact within the chip. For example, according to the matrix above, the conventional write and add, as well as the multi-write and multi-add, are not orthogonal. It was stated in the discussion on simultaneous operations that this results from the fact that both operations are simultaneously attempting to change the output of the AM bit, perhaps to different values. Referring now to FIG. 3, we see that individual data paths followed by the write and add operations interact at the two NAND gates 76 and 77 surrounding point J (each data path is one input) Configured as in FIG. 3, these two gates operate so that the J and K inputs are both high if either the write or the add operation tries to set the flip flop to "1." Thus, as mentioned in the discussion on simultaneous operations the result of binary add/write operation, as well as the binary multi-add/multi-write, is the logical OR of the component operations.

The Response Store

Throughout the design of the associative chip the requirements of the Response Store elements of the AM have been kept in mind so that the RS may be constructed by adding a minimum amount of logic to this chip. The associative chip is thus the primary unit in the RS and any integral number of these represent a convenient length for the RS. If a particular application requires a RS length that does not correspond to an integral number of chips, the left over bit may be permenantly ignored by grounding their input lines 3, 4, and 15, the search control registers and the multi-operation registers. For each bit in the Response Store section of the word-slice, input line 1 from the syllable definition register should be permanently grounded. This automatically divides the RS into a series of one bit syllables.

Figure 8:
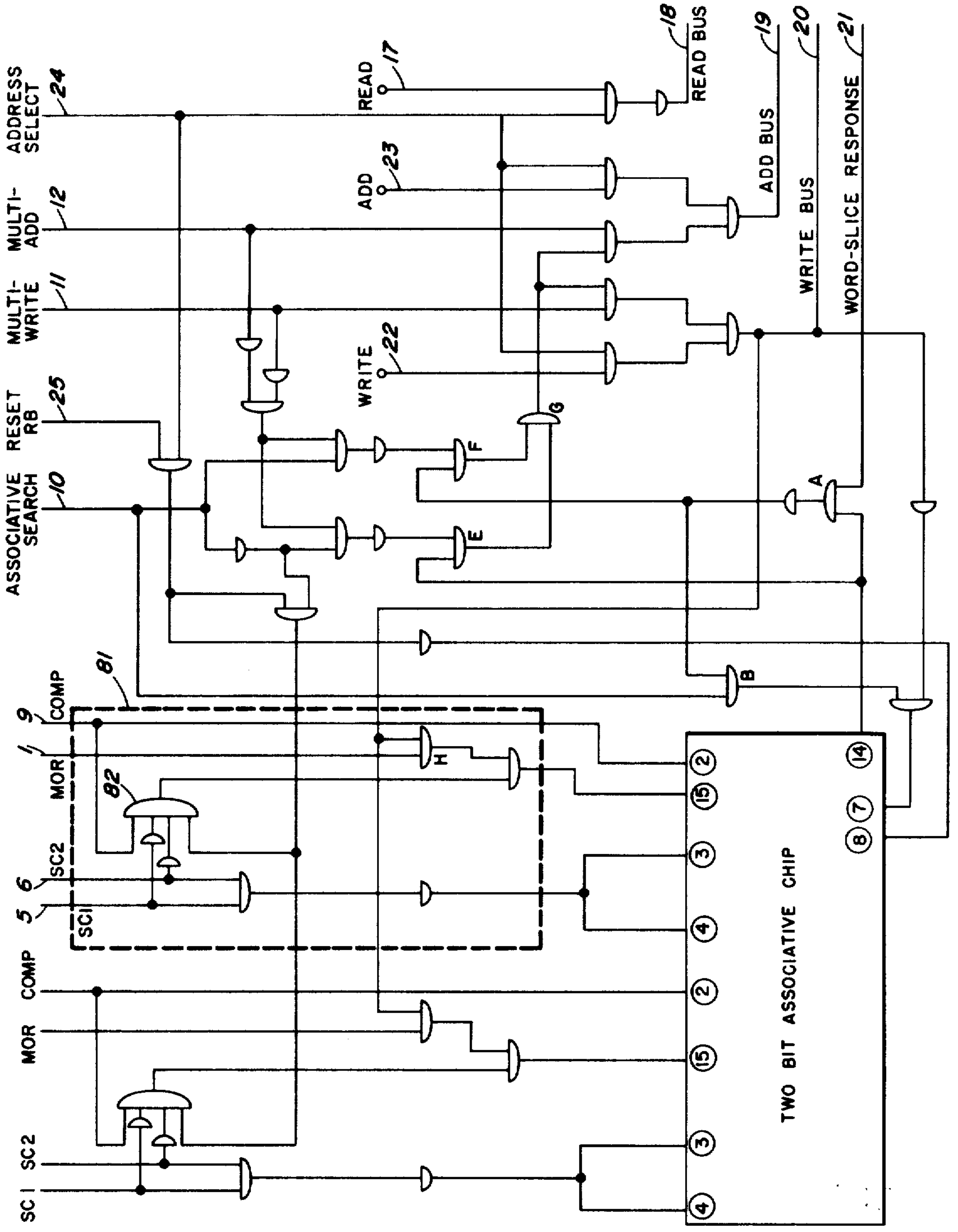
FIG. 8 illustrates the logic circuitry for a two bit response store.

A NAND logic implementation of a two bit Response Store (built around a two bit associative chip) is depicted in FIG. 8. This design requires the addition of 7M + 27 NAND gates, where M is the number of bits in the RS. As mentioned in the discussion on the associative chip, it is useful to specify digital designs as a set of Boolean equations. A set of Boolean equations, in terms of the numbered response store control lines shown in FIG. 15, describing the RS operation shown in FIG. 8 is given as follows:

$$3 = 4 = 5 \cdot 6$$
$$2 = 9$$
$$18 = 24 \cdot 17$$
$$15 = \overline{5} \cdot \overline{6} \cdot 9 \cdot (10 + 24 \cdot 25) + 22 \cdot 24 \cdot 1 + 11 \cdot 14 \cdot 1 \cdot (\overline{10} + 10 \cdot 21)$$
$$7 = 21 \cdot 14 \cdot 10 + 22 \cdot 24 + 11 \cdot 14 \cdot (\overline{10} + 10 \cdot 21)$$
$$8 = 24 \cdot 25$$
$$20 = 22 \cdot 24 + 11 \cdot 14 \cdot (\overline{10} + 10 \cdot 21)$$
$$19 = 23 \cdot 24 + 12 \cdot 14 \cdot (\overline{10} + 10 \cdot 21)$$

The combination of both of the set of Boolean equations set forth above forms a complete description of the AM design.

Depending upon the size of the AM to be built, the additional RS logic may be individually wired for each word-slice or implemented as a second integrated circuit chip. This additional logic is of two functional types.

Referring to FIG. 8, that section of logic to the right of the associative chip is independent of RS length and is designed to drive the RS and the various busses according to the operational requirements described above. The logic network above the associative chip and enclosed in dotted lines 81 appears once for every bit in RS. This network arranges the bit inputs to the associative chip to induce the differences in behavior between a bit in RS and other bits in the rest of the word-slice.

The operation of the additional logic in FIG. 8 is most easily described by considering individually the various AM operations.

The Response Store and the Associative Search

It has been set forth above that whenever the RS is searched (as part of a number of operations), the following search specification code

| SC1 | SC2 | Type of basic search |
|---|---|---|
| 0 | 1 | Don't care. |
| 1 | 0 | DO. |
| 1 | 1 | Exact match to the comp. |
| 0 | 0 | Don't care. |

is different from the code satisfied by non-RS sections of the word slice, which is as follows:

| SC1 | SC2 | Type of basic search |
|---|---|---|
| 0 | 1 | Greater than the COMP. |
| 1 | 0 | Less than the COMP. |
| 1 | 1 | Exact match to the COMP. |
| 0 | 0 | Anything will do (don't care). |

Since the associative chip has been designed to satisfy the latter, one of the functions of the additional RS logic is to effect a transformation between these codes. By tracing the SC1 and SC2 inputs of a RS bit (i.e. inputs in the Response store search code), one can see that chip inputs 3 and 4, what the chip "sees" as SC1 and SC2, give the proper specification when interpreted as shown above for the non-RS section of the word slice.

From the discussion of the SC registers and the associative search line to the AM is raised, a bit may be set in the RS section of every word slice satisfying that search. The particular bit to be set is specified by the occurance of the command register pattern shown as follows:

| | |
|---|---|
| COMP | 1 |
| CS1 | 0 |
| CS2 | 0 |

Referring to the bit-associated network in FIG. 8 (within the dotted lines), this requirement is implemented by the four input NAND gate 82 near the top. Thus,if the associative search line is high and if the control register pattern for that bit is that of the above command register pattern, the MOR input to the associative chip is raised. Unless a write operation is being performed, the rest of the network inhibits the line from the actual MOR. Therefore, if the associative search line is raised, and the write or multiwrite lines are not, the only bits with a non-zero MOR input (chip input 15) will be those with a control register pattern as shown above.

Turning to the RS drive network, it is seen that the results of the RS search is combined with the response of the rest of the word slice (output 14 of bit number one) at gate A. Therefore, gate B will have a low output if and only if the associative search line is high and the entire word-slice (including the RS) satisfies all search criteria. A zero output from gate B will result in a raised chip input 7, which is the "write" input of the associative chip. Thus, any bit with a MOR input of "1" will have the COMP written into it. Combining this fact with the results of the previous paragraph, it is seen that the RB (as specified according to the Response store indicator bit above) will be set in every word slice satisfying all search criteria, as required by the search command registers and the associative search operation.

The RS and the multi-Operations

From the discussion above on the multi-operation register, it was set forth that when the multi-write (multi-add) line is raised alone, the COMP, masked by the MOR, is written (added) into every word-slice satisfying search criteria on the RS section. Referring to FIG. 8, gate E will have a zero output if either the multi-write or the multi-add line is raised and if the associative search line is not raised, and if the RS portion of the word-slice satisfies its search criteria (which is obivous by tracing chip output 14). If the output of E is zero then the output of gate G is forced high. If the output of G is high and the multi-write (or multi-add) line is high, then the write bus (or add bus) is raised as required.

It is noted that if the write bus is high, the write input (input 7) of the RS chip is also raised and MOR the contents are gated into the chip (see gate H). This satisfies the requirement that the multi-write be extended into the RS. It is this provision that permits the "clear response store" operation depicted as follows:

| | 16 | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|---|
| SDR | X | X | X | X | X | X | X | X | X | X | X | X | X | X | X | X |
| COMP | 0 | 0 | 0 | X | X | X | X | X | X | X | X | X | X | X | X | X |
| SC1 | 0 | 0 | 0 | X | X | X | X | X | X | X | X | X | X | X | X | X |
| SC2 | 0 | 0 | 0 | X | X | X | X | X | X | X | X | X | X | X | X | X |
| MOR | 1 | 1 | 1 | 0 | 0 | 0 | 0 | 0 | 0 | 0 | 0 | 0 | 0 | 0 | 0 | |

The Conventional Read, Write, and Add

In the conventional read, write, and add operations, word slice selection is specified by the AMOR. The address in the AMAR is decoded so that the address select line of the corresponding word slice in AM is raised. Any one of the conventional address selection techniques may be used here. All of them trade off the primary parameters of speed, fan-in, fan-out, and circuit complexity (diode count). Optimization of this trade off can only be accomplished if one has a small range of memory sizes in mind.

From FIG. 8 one sees that if the address select line of a word-slice is raised and either the write, add, or read line to the AM is raised then the appropriate bus of this word-slice (write bus, add bus, or read bus) is forced high. As in the multi-write, the write operation includes the RS bits. The read and add operations do not.

The Response Bit Complement Operation

When the RB complement line to the RS is raised, the RB (as specified above) of that word-slice whose address is in the AMAR will be complemented. This operation is primarily used to reset the RRB as will be described below.

Referring to FIG. 8, one sees that if the RB complement line and the address select line are both raised, the bit-associated networks will operate as described in the RS and the associative search section above. Also, input 8 (the add input) will be raised. Since the RB is the only bit with a non-zero MOR input, the COMP will be added to the RB alone. As the RS is divided into a series of single bit syllables in the RS this results in the complementing of the RB.

The RS and Simultaneous Operations

The logic described so far is not capable of handling the situation where either the multi-add or the multi-write line is raised at the same time as the associative search line (as specified in the simultaneous operations Section). The reason for this is that the add (or write) bus can no longer be raised solely on the condition of the RS search response. Instead, the add or write is to be conditioned on the combined response of the RS and the rest of the word-slice (i.e. as in the associative search). This condition is satisfied by the combined logic of gates A, F, and G FIG. 8. It is noted that in the case of a simultaneous search and multi-write operation, the COMP will be written into those RS bits with a "1" in the MOR as well as into those with the search command pattern set forth above.

All other simultaneous operations are adequately handled by the RS logic of FIG. 8. In general, the actions of the individual operations that make up the simultaneous operation are executed independently.

Response Resolution Network

The Response Resolution Network (RRN) is designed to supply the MPP with a list of addresses of those AM word-slices that have a "1" set in the RRB. An alternate approach might supply the MPP with the rsponses, themselves, instead of their addresses. However, since information storage in the AM is relatively expensive, it is advantageous to use the absolute address of a word-slice as a pointer to auxiliary files. It is possible to store the address within the word-slice itself, so that it is read out with the response. However, as will be shown below, this is generally more expensive than decoding the address with the RRN of the present design.

As mentioned in the Search Command registers and the associative search operation section the RRB is the extreme left hand bit in the RS. Its output is connected to the RRN. This is accomplished by permanently raising the read input (input line 5) into the RS chip containing the RRB. Output line 6 of the RRB is then connected to the RRN. Therefore, when one is interested in actually working with those word-slices that have responded to a set of associative searches one should specify the RRB as the RB of the last search.

Specifically, the RRN operates as follows: When a "get response" signal is passed to the RRN from the MPP, the RRN gates onto the AMAR the address of the lowest addressed word-slice with the RRB set. By simultaneously raising the AM read and RB complement lines, the MMP can read out the contents of that word-slice and at the same time reset its RRB to "0." A subsequent "get response" signal to the RRN will gate the address of the next higher responding word-slice onto the AMAR, etc. In this manner, the MMP can obtain a full list, both of the responses and their absolute addresses.

One of the RRN outputs is a line that goes high if at least one of the RRB's is set. This indicates to the MPP, directly after a search, whether any word-slice has responded and also indicates when the last element in the response list has been extracted by the above method. Clearly, knowledge, before reading out this list, of the total number of AM responses would be of great value to the MPP. While obtaining an exact number would take as much time as reading out the full list, an approximate number is quickly available by the following method: Taking each input to the RRN (the output from each RRB), one may pass them all through a summation amplifier and perform an analog to digital conversion on the resulting voltage. The value obtained by this method may be used to indicate the approximate number of responses.

A number of RRN's have been proposed for early model associative devices. Almost all of them have performed some sort of linear search. For those older equipments a linear search has been adequate due to the relatively slow associative search times. However, in the present design a linear RRN would severely degrade the performance of the AP, so that one must match its fast associative search time with a faster than linear RRN, described below.

A symmetric (graphtheoretic) tree has the property that the height of the highest branch is equal to the logarithm of the number of branch tips. One would therefore like to construct such a tree (out of two-input NAND gates) whose root is high if any response store bit is high. To resolve the ambiguity between multiple responses, one must climb the tree, pruning off the branch associated with a higher address whenever an ambiguity is found. When one reaches a branch tip (RRS), the resulting subgraph defines a unique chain connecting the base of the tree (any response) with the lowest addressed word-slice with the RRB set.

Figure 9:
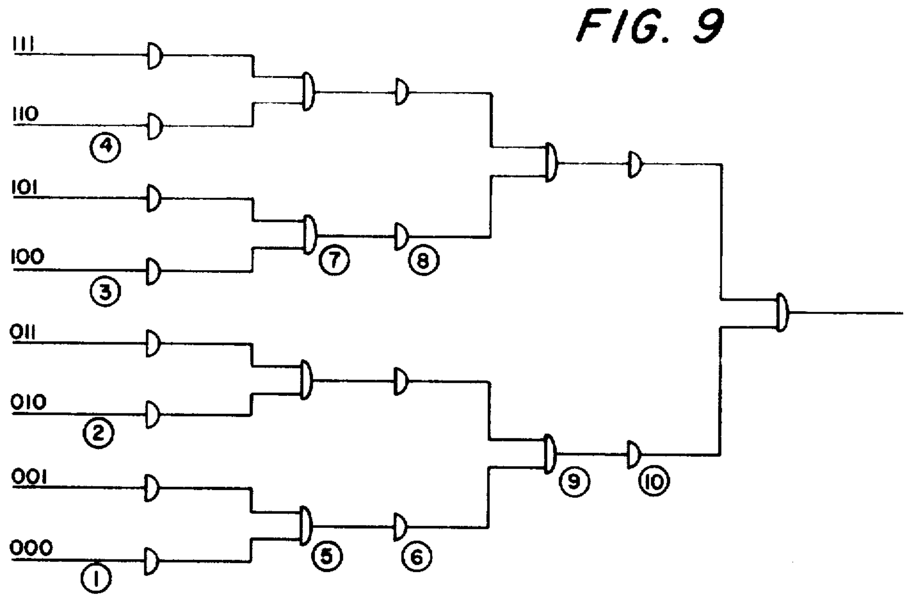
FIG. 9 is a circuitry for addressing the response resolution bit of the response store of the associative processor for a base 2 response resolution network.
Figure 12D:
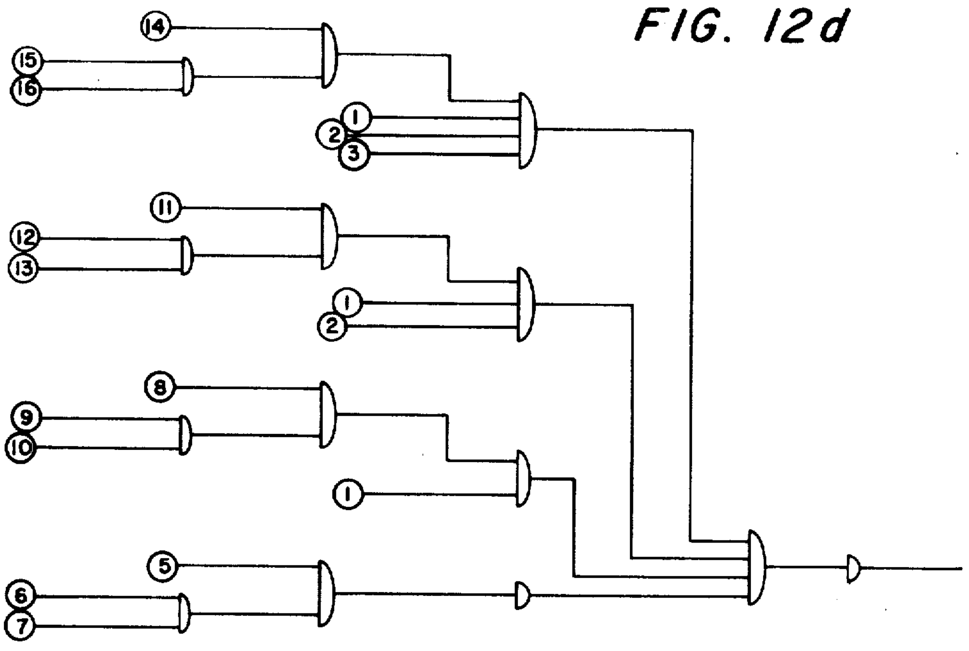
FIGS. 12a – 12d illustrate the secondary circuitry for decoding each bit in the address of the lowest responding word slice.
Figure 10A:
FIGS. 10a – 10c are circuitry for decoding one bit of a required address in the Response store network.
Figure 10B:
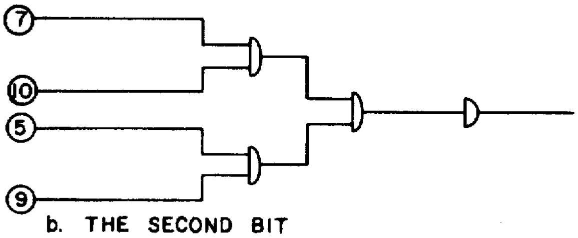
Figure 10C:
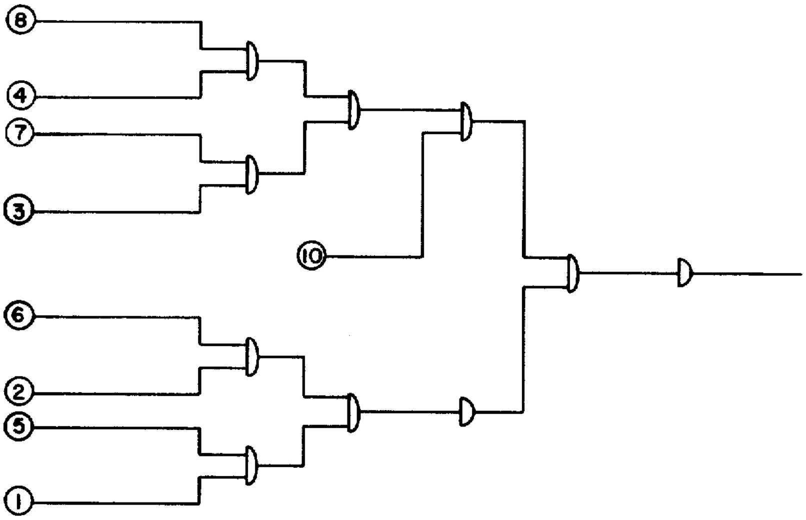

A circuit whose output is high if at least one RRB is set as depicted in FIG. 9 for an eight word AM. The circled numbers in FIG. 9 are take off points which are connected to corresponding circled numbers in the address decoding circuit of FIG. 10. (*a–c*). Each of the eight inputs is to be connected to the RRB of the word-slice with the indicated address. If the output of this circuit is high and if a "get response" signal is generated by the MPP, this tree must be decoded to determine the lowest addressed word-slice that has responded. This is the function of the circuits in FIG. 10, each of which decodes one bit of the required address. Thus, the output of the circuit in FIG. 10*a* is the most significant bit of the lowest addressed word-slice with the RRB set, etc. 10(*b*) is the second bit and 10(*c*) is the least significant bit. The output of each of these circuits is gated into the corresponding bits of the AMAR if the "get response" line (not shown) is raised by the MPP.

The gate requirements of these circuits may be calculated as follows: For an AM of $2^N$ words, the basic circuit requires $$3(1+2+\ldots+2^{N-1})=3\sum_{i=0}^{i=N-1}2^i=3(2^N-1) \qquad (5)$$

gates. Decoding the most significant bit of the lowest responding address requires no additional gates. The second most significant bit requires $1+3(1)$ gates. The third requires $1+3(1+2)$. In general, the Mth most significant bit requires $$1+3(1+2+\ldots+2^{M-2}) = 1+3\sum_{i=0}^{i=M-2}2^i=1+3(2^{M-1}-1) \qquad (6)$$

gates. Thus, decoding the entire address requires $$(N-1)+3\sum_{M=1}^{M=N}(2^{M-1}-1)=3(2^N)-2N-4 \qquad (7)$$

gates. Adding Equation 5, we see that the entire RRN requires a total of $$G_z=6(2^N)-2N-7 \qquad (8)$$

gates for an AM of $2^N$ words. In the limit, the RRN thus requires only 6 gates per word-slice. It is noted that if the RRN is implemented in AND or OR logic, or some combination of the two, this is further reduced by a factor of between one-third and one-half, with an appropriate increase in speed.

As mentioned above, an alternate method of obtaining the address is to store it within each word-slice and read it out with the response. A modified tree circuit that reads out only the lowest addressed response may require only 1 or 2 gates per word-slice. However, storing the address within the word-slice requires at least N additional gates. For practical sized memories, therefore, this alternate method is clearly more expensive.

Figure 11:
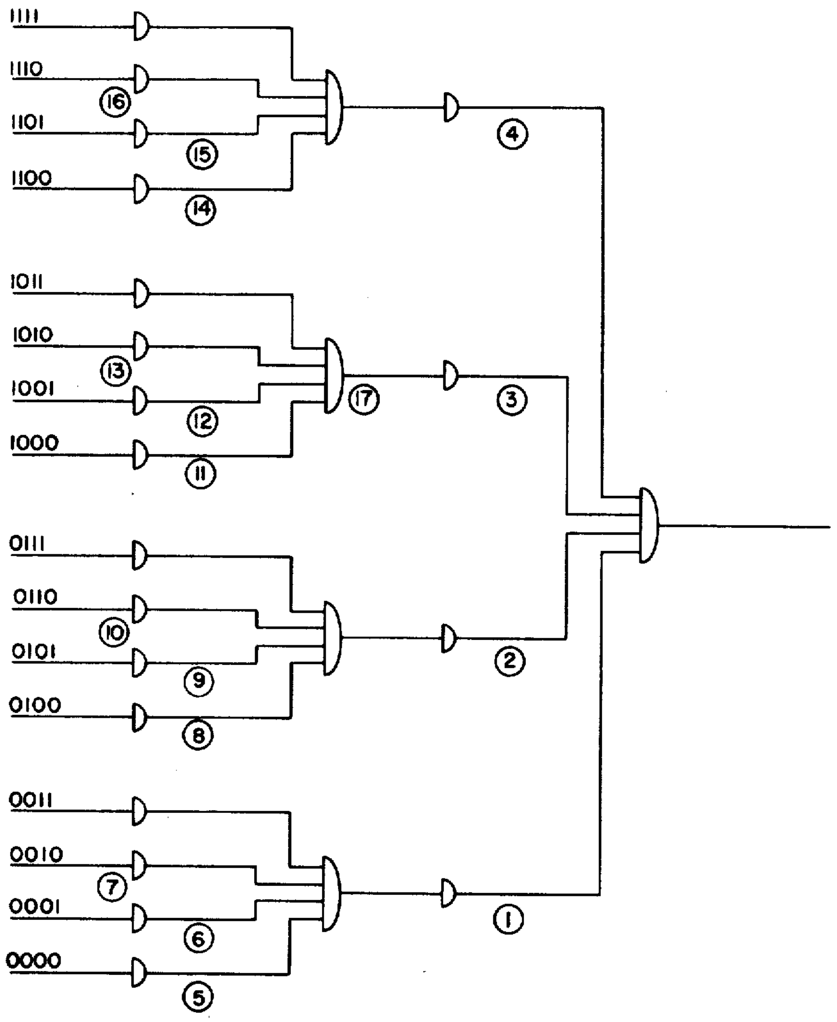
FIG. 11 illustrates the primary circuit of a base 4 response resolution network for a memory of $4^N$ words.
Figure 12A:
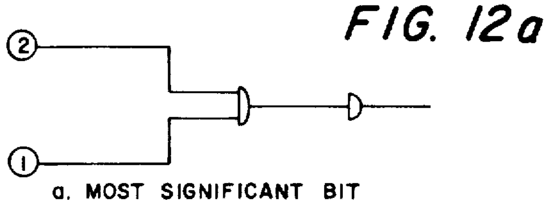
Figure 12B:
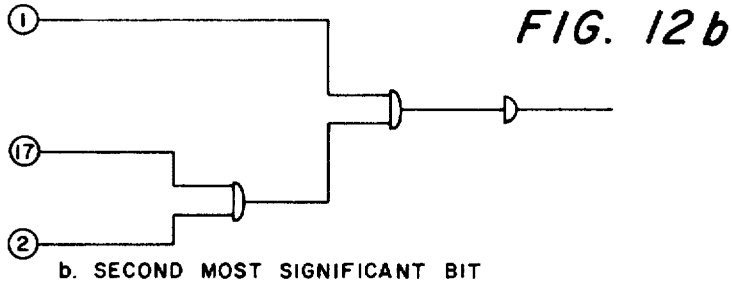
Figure 12C:
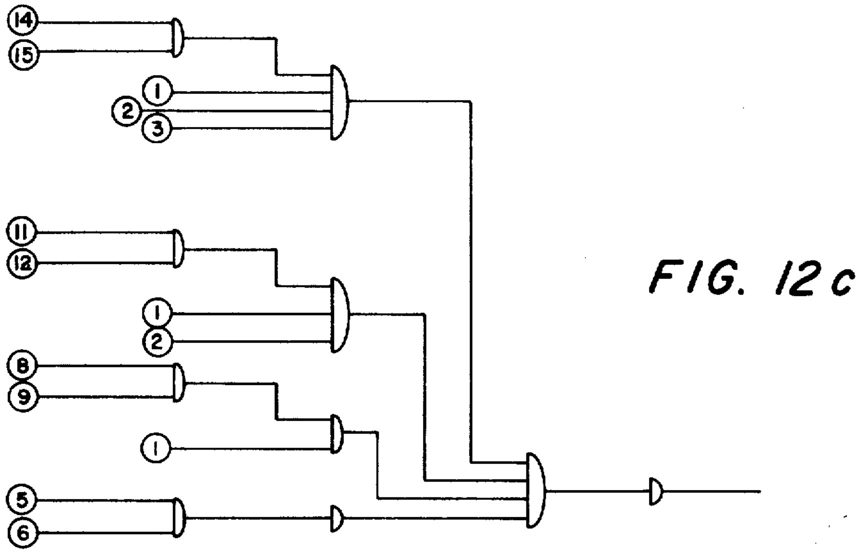

The principles applied to the base 2 RRN described above can be extended to a RRN of any base. For example, for a memory of $4^N$ words the primary circuit of a base 4 RRN is shown in FIG. 11 (corresponding to FIG. 9 of the base 2 system). The circled numbers shown in FIG. 11 are take off points which are connected as inputs to corresponding circled numbers as shown on the address decoding circuits of FIG. 12 (a-d). Secondary circuits to decode each bit in the address of the lowest responding word-slice are shown in FIGS. 12*a*–12*d*. 12(*a*) is the most significant bit, 12(*b*) is the second most significant bit, 12(*c*) is the third most significant bit, and 12(*d*) is the least significant bit. The basic circuit (FIG. 11) requires.

$$5\sum_{i=0}^{i=N-1} 4^i = 5\frac{(4^N-1)}{3} \quad (9)$$

gates. Each word-slice in a memory of $4^N$ words has an address 2N bits long. Labelling each successive pair of bits with an index, $M$, there are $N$ pairs of bits, where $M = 1$ stands for the two most significant bits of the address, etc. To decode each pair of bits requires $$4^{M-1}+4\sum_{i=0}^{i=M-1} 4^i = 4^{M01}+\frac{4(4^M-1)}{3} \quad (10)$$

gates ($M = 1$ corresponds to FIGS. 12*a* and 12*b*). Decoding the entire address requires $$\sum_{M=1}^{M=N} 4^{M-1}+\frac{4}{3}\sum_{M=1}^{M=N} (4^M-1)$$

$$=\frac{4^N-1}{3}+\frac{4}{3}\,\frac{4^{N+1}-1}{3}-(N+1) \quad (11)$$

gates. Adding equation 9, we see that the entire base 4 RRN requires a total of $$G_4 = 2(4^N - 1) + (4/3)\,(4^{N+1} - 1)/(3) - (4/3)\,(N + 1) = (34/9)\,(4^{N-1}) - (4/N) \quad (12)$$

gates. In the limit, this reduces to 3 7/9 gates per word-slice. Similar to the base 2 system, different logic technologies can further reduce this by a factor of between one-third and one-half, bringing the total down to approximately one gate per word-slice. FIG. 15 illustrates a summary of the control lines for the response store.

Timing Considerations

In order to obtain a rough idea of the speed at which the AP will operate, it is useful to analyze the timing of the associative processor circuits. In the following analysis, several implicit assumptions have been made. First of all, operation times are calculated according to the circuit implementation, the associative chip, and the associated circuits. It has been pointed out that, when constructed, these circuits may look quite different, especially if they are derived from the Boolean equations set forth above. Second, it has been assumed that a single NAND gate delay is a constant, independent of the number of inputs. Finally, the need for line drivers or sense amplifiers have been ignored, both of which will re required at various points in the AM.

In the addition section of the solid state chip Section, it has been mentioned that race-time problems are eliminated if one makes sure that the next clock pulse after the initiation of an operation does not come before all J-K inputs have reached a steady state. Thus, a convenient definition of operation time is the time, in gate delays, from the initiation of an AM operation until it is "safe" to inject the next clock pulse (thereby terminating this operation and, initiating the next one). As might be expected, AM operation times are dependent not only on the specific type of operation (search, multi-add, etc.), but also on the contents of both the control registers and the AM itself. Therefore, the nature of this dependence on an operation by operation basis will be set forth below.

The Associative Search Time

First consider a "simple" associative search consisting solely of "exact match" and "don't care" specification, i.e. a search that is entirely bit-wise independent. Examination of the associative chip circuit shows that the response of each bit is abailable at point R, a maximum of five gate delays after new values are gated onto the control registers. The two gate network that combines the responses for each chip with those of the preceding chip appears once on each chip. If there are a total of $K$ chips in the non-RS section of the word-slice, the total time until the combined response is available at output of bit one (1) is given by $$T_0 = 5 + 2K \quad (13)$$

gate delays. (throughout the following discussion, all times are expressed in units of a single gate delay.) This final output corresponds to line 21 of the RS in FIG. 8. From the time that this output is ready, it takes an additional four gate delays until RS chip input 7 has been raised (assuming that the associative search line is high). From FIG. 3, it is seen that another two gates are required until the J-K inputs are properly arranged. Thus, the RS action takes an additional six gate delays and the total time necessary for the bit-wise independent search is $$T_1 = 1 + 2K\,. \quad (14)$$

Now consider the more complex search that involves a "greater" or "less than" specification. To take a worst-case example, suppose that the entire N bit (non-RS) word-slice is one syllable and that one is searching for syllable in AM larger than the COMP. A worst-case word-slice that satisfies this search will have its most significant bit larger than that of the COMP with all remaining bits less than the corresponding COMP bits, thus, requiring the affirmative response to ripple down through every bit. The response (at R) of the most significant bit is available five gate delays after initiation. The "response propagation" signal (output line 12, FIG. 3) is available one gate delay sooner. The response of the next bit is available one gate delay after this (trace input line 11). In general, the response (at R) of the least significant bit is available at $$T_2 = 5 + 2(N - 2)\ (N \geqq 2) \quad (15)$$

Meanwhile, the chip responses (output 14) are propagating down at the same effective speed, since the output of the summary network (enclosed in dotted lines in FIG. 8) must always wait for the least significant bit of the chip before jumping to the next chip and waiting again. After the response of the least significant bit is available, an additional two gate delays are required before the word-slice output is available to the RS. Adding to this the six gate delays necessary for the RS operation, we see that a worst-case time of $$T_3 = 9 + 2N \tag{16}$$

is required for the "greater than" (or "less than") search.

It is concluded that the time required for an associative search operation will always lie between the limits $$11 + 2K \leqq T_s \leqq 9 + 2N, \tag{17}$$

regardless of the search criteria.

To take the analysis one step further, consider the fact that upper limit of $T_s$ is a function not only of the length, but of the position of the largest syllable. To see this, suppose that in the $N$ bit (non-RS) word-slice, the largest syllable subject to a non-simple search (i.e. the largest syllable with a "greater than" or "less than" search criteria) is $M$ bit long. It will take $5 + 2(M - 2)$ gate delays until all responses of this syllable are ready. If this syllable is located at the extreme "left" of the word-slice (i.e. if it occupies the most significant bits) an additional 2L gate delays are required for the response to reach the RS, where L is the number of chip edges standing to the right of the syllable. (This is independent of the syllable configuration of the remaining bits since the other bit's response will all be ready before that of the least significant bit of the largest syllable.) Adding the RS operation time, it is seen that the associative search time is now within the reduced interval $$11 + 2K \leqq T_s \leqq 7 + 2M + 2L. \tag{18}$$

Note that if $M = N$, then $L = 1$ and the upper limit becomes $2N + 9$, as in Equation 16.

If the largest syllable is located, instead, at the extreme right side of the word-slice the upper limit in Equation 18 is reduced even further. The closed form of this new limit is a fairly complex function of M, N, and the syllable configuration of the rest of the word-slice. In general, the limit is less than that in Equation 18 and lies within the interval $$2M + 11 \leqq \text{upper limit} \leqq 7 + 2M + 2L, \tag{19}$$

where $L$ is now the number of chip edges to the left.

If necessitated by processing speed requirements, the lower limit in Equation 18 and the upper limit, given by Equation 19, can both be reduced. The procedure also eliminated the dependence of the search operation time on the position of the largest syllable (although not on its length). To accomplish these improvements (at the expense of construction costs), input 13 of each chip is permanently raised and output 14 is no longer connected to input 13 of the next chip. Suppose that one has K chips in the (non-RS) word-slice. If all K response lines (output 14 from each chip) could pass through a K-input AND gate, the output of this gate would be the overall word-slice response. Practically speaking, there is a technological limit on the number of gate inputs. Suppose that the largest AND gate available has P inputs. If one starts with one such gate and takes as inputs the outputs of $P$ other identical AND gates, one has a $P^2$ — input AND network that involves only two gate delays. In general, one can construct a $P^n$ input AND network requiring $n$ gate delays. Applying this to an AM word-slice, if $n$ is the smallest integer such that $$P^n \geqq K,$$

one may build a network of between $$\sum_{i=1}^{i=n-1} p^i \text{ and } \sum_{i=1}^{i=n} p^i$$

AND gates that combine the $K$ chip responses in n gate delays. This network reduces the search operation time to within the interval $$13 + N \leqq T_s \leqq 9 + 2M + n \tag{20}$$

(compare with Equations 18 and 19). As an example, suppose that one has available six-input AND gates, but less than 37 chips, and that the largest syllable with a non-simple search specification (as defined by the SDR and the two SC registers) is 20 bits long. Then, $$15 \leqq T_s \leqq 51, \tag{21}$$

the exact value being dependent upon the search criteria. Note, that $T_s$ is independent of both total word-slice length and overall AM size.

Addition Time

If one considers FIG. 3 as the least significant bit of some syllable (so that the carry is zero), it has been determined that after new values become available on the control lines, it takes $$T_4 = 9 \tag{22}$$

$$\text{or } T_4 = t_{ab} + 4 \tag{23}$$

whichever is greater, until the J-K inputs for this AM bit are properly arrange. Here, $t_{ab}$ is the time at which the add bus is raised. The carry from this bit to the next more significant (to the left) arrives at the second bit after two gate delays. The carry to the third bit arrives after six gate delays. In general, the carry input to the $n^{th}$ bit is completely determined after $t_c = 2n$ gate delays, for $n > 2$. If FIG. 3 represents a bit such that $n > 2$, then it is seen that the addition is completed at $$T_5 = t_c + 6 \quad 2S + 6 \; (S>2) \tag{24}$$

$$\text{or } T_5 = t_{ab} + 4, \tag{25}$$

whichever is greater. Hence, if the largest addition syllable is $S$ bits wide, addition takes no longer than $2S + 6$, unless $t_{ab} > 2S + 2$. The size of $t_{ab}$ depends upon the type of add being performed.

Multi-Addition Time

Referring to FIG. 8, it is seen that two gate delays are required until the transformed SC contents enter the RS chip. Within the chip, it takes five gate delays until all bits respond (the RS search is always bit-wise independent — see the discussion on the Response Search and related search code). Another two gate delays are required to collect the responses so that the RS search is completed in a total of nine gate delays. Tracing chip output 14 (FIG. 8), it is seen that the add bus is raised at $$t_{ab} = 15. \tag{26}$$

Thus, the multi-add operation time will always fall within the limits $$19 \leq T_{MA} \leq 2S + 6 \tag{27}$$

where $S$ is the number of bits in the largest addition syllable (as defined by the SDR and MOR). Equation 27 is to be interpreted so that if $S < 5$ bits, $T_{MA} = 19$.

Conventional Addition Time

From FIG. 8, one sees that if the conventional add line is raised, the add bus is raised at $$t_{ab} = t_{dec} + 2, \tag{28}$$

where $t_{dec}$ is the time it takes to decode the contents of the AMAR and raise the appropriate address select line. Thus, the conventional add operation time falls between the limits $$t_{dec} + 6 \leq T_A \leq 2S + 6. \tag{29}$$

Equation 29 is to be interpreted so that if $S < t_{dec}/2$, $T_A = t_{dec} + 6$.

AM Write Time

From FIG. 3 one sees that from the time a new value is gated onto the COMP, $$T_6 = 6 \tag{30}$$

or $T_6 = t_{wb} + 2$ gate delays (31)

whichever is larger, is required until the J-K inputs are stable, where $t_{wb}$ is the time at which the write bus is raised. Similar to $t_{ab}$, the size of $t_{wb}$ depends upon the type of write being performed.

Multi-Write Time

From FIG. 8 and the discussion of the multi-addition time it is clear that $$t_{wb} = 15, \tag{32}$$

so that the multi-write operation time is $$T_{MW} = t_{wb} + 2 = 17. \tag{33}$$

Conventional Write Time

From FIG. 8 and the discussion of the conventional additional time, it is seen that the conventional write time is $T_W = t_{dec} + 4$ (assuming $t_{dec} > 2$). (34)

AM Read Time

From FIG. 3, it is clear that $T_R$, the time until the contents of an AM word-slice is available to the AMOB is given by $$T_R = t_{rb} + 2, \tag{35}$$

where $t_{rb}$ is the time at which the read bus is raised. From FIG. 5 we see that $$t_{rb} = t_{dec} + 2, \tag{36}$$

so that $$T_R = t_{dec} + 4. \tag{37}$$

Reduced Operation Times

Comparing Equation 29 (conventional add), Equation 27 (multi-add), and Equation 20 (associative search), the following fact is noticed: The upper limit in each equation represents a worst-case operation. For an AM of sufficient size, there will always (statistically speaking) be one word-slice that is nearly worst-case, so that the operation times will for the most part remain near the upper limits. Thus, $$T_s \approx 9 + 2M + n, \tag{38}$$

$$T_{MA} \approx 2S + 6, \tag{39}$$

and $$T_A \approx 2S + 6, \tag{40}$$

along with Equations (33), (34), and (37), which are $$T_{MW} = 17, \tag{33}$$

$$T_W = t_{dec} + 4, \tag{34}$$

and $$T_R = t_{dec} + 4, \tag{37}$$

one has six equations that describe the basic AM operation times.

In deriving the six above equations, it has been assumed that the contents of various control registers had changed as the AM operations were initiated. Let us now withdraw that assumption. Operationally, this might correspond to the second of two AM operations executed with the same control register pattern or it might occur if the MPP has other operations to perform between loading the control registers and raising the appropriate operation line to the AM.

Consideration of FIGS. 3 and 8 as well as the arguments leading to Equations 33, 34, and 37–40 results in the following relationships:

If the COMP, SC1, and SC2 have been stable for $5 + 2M + n$ gate delays, the search operation time is reduced to $$T_S' = 4. \tag{41}$$

If the COMP and the MOR have been stable for 2S–6 gate delays and the RS portions of the COMP, SC1, and SC2 have been stable for five gate delays, $$T_{MA}' = 12. \tag{42}$$

If the AMAR has been stable for at least $t_{dec}$ and the COMP and MOR have been stable for 2S gate delays, then $$T_A' = 6 \tag{43}$$

If the RS sections of the COMP, SC1, and SC2 have been stable for five gate delays, $$T_{MW}' = 6. \tag{44}$$

If the AMAR has been stable for at least $t_{dec}$ and the COMP has been stable for two gate delays, $$T_W' = 4. \tag{45}$$

Finally, if the AMAR has been stable for at least $t_{dec}$

24

$$T_R' = 4. \tag{46}$$

It is mentioned once again, that all of the above figures are independent of both word-slice length and overall AM size.

Simultaneous Operation Times

Suppose a binary operation as discussed above is composed of the two single operations $O_1$ and $O_2$, with operation times $t_1$ and $t_2$, respectively. It should be clear that in most cases the binary operation time is simply the larger of $t_1$ and $t_2$. This is because the operations execute independently. The only exceptions to this rule are the search/multi-write and search/multi-add operations, the exception being due to the modification, described above in simultaneous operations that the multi-operation is executed for those word-slices satisfying the entire search, instead of just the RS search.

Consider the search/multi-add binary operation. Six gate delays are required for completion of an associative search after the word-slice response is available at gate A, in FIG. 8. Tracing the output of A through gates F and G to the add bus (in the case of a simultaneous operation) one sees that the add bus is raised six gate delays after the word-slice response is available at gate A. Since an additional four gate delays are required to complete the addition the following is concluded: If $T_{MA} > T_S$, the binary operation time is give by $$T_{S/MA} = T_{MA} \tag{47}$$

However, if $T_{MA} < T_S$, then the binary operation time is $$T_{S/MA} = T_S + 4. \tag{48}$$

A similar analysis shows that $$T_{S/MW} = T_S + 2. \tag{49}$$

($T_S$ is always greater than $T_{MW}$). These increments are hardly significant. In general, then, it can be said that a binary operation takes little or no more time than the longest of its two component operations.

The Response Resolution Time

Consideration of FIGS. 9 and 11, as well as the discussion in the RRN Section shows that for an AM of M words, the primary circuit of a base B RRN requires no more than $$T_7 = 2\log_B(M) \tag{50}$$

gate delays to stabilize after any RRB's are changed (assuming the availability of B-input NAND gates). The secondary circuits stabilize within an additional two gate delays, so that the total time to retrieve the address of the lowest responding word-slice is $$T_{RRN} = 2(\log_B M) + 2. \tag{51}$$

as mentioned above, this may be reduced as much as 50 percent through use of different logic technologies.

Examination of FIGS. 3 and 8, shows that the time necessary to reset the RRB of this word-slice (and, if desired, simultaneously read it out) is $$T_{RRB/R} = t_{dec} + 6. \tag{52}$$

Practical Consideration

From the above analysis, it is clear that AM operation times are highly dependent not only upon the type of operation but also upon the contents of the AM control registers. This suggestion that to obtain maximum AP processing speed, the use of an asynchronous clock is necessary. Just how necessary is clear when one considers the clock repetition rate required by the use of a synchronous clock. From Equation 17, it is seen that if the AM is 60 bits wide, the maximum operation time, which defines the fastest possible synchronous clock rate, would be 129 gate delays. Since a large percentage of AM operations take only small fractions of this time, It is seen that the use of a synchronous clock is unnecessarily restrictive.

Figure 13:
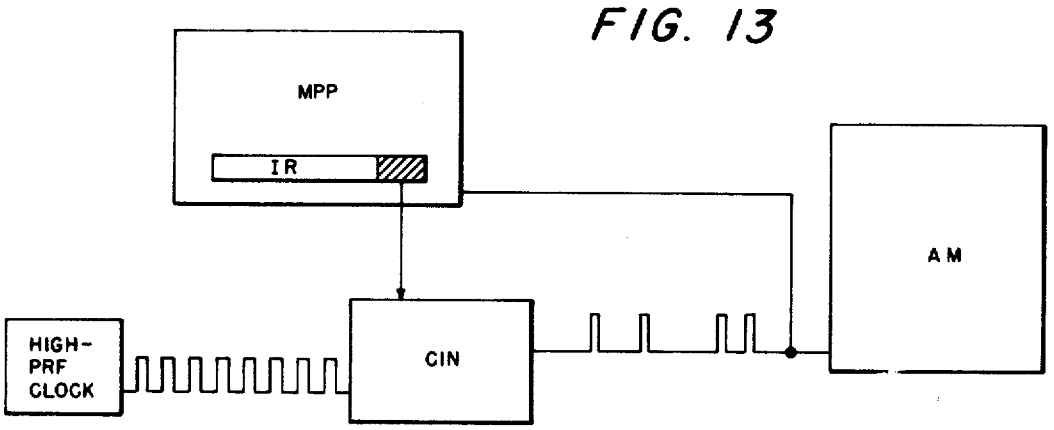
FIG. 13 illustrates the associative processor in combination with a high performance clock and a clock inhibit network (CIN).

A high-PRF synchronous clock can be conveniently converted into an asynchronous clock that drives the AM as efficiently as possible (wasting a minimum amount of time) by use of a Clock Inhibit Network (CIN), shown in FIG. 13. The CIN operates as follows: In each MPP instruction, one syllable contains an AM operation time parameter. This (complier produced) parameter is arrived at through consideration of AM operation type as well as control register contents and age of contents. The output of the corresponding syllable in the MPP Instruction Register (IR) is connected to the CIN. The CIN inhibits the incoming clock pulses until the required period (as specified by the operation time parameter) has passed, at which point one clock pulse is allowed to continue through to the CIN output. This output is connected both to the AM and to the MPP. When the clock pulse arrives at the MPP, the next instruction is gated onto the IR.

If a particular instruction does not involve the AM, i.e. if the AM instruction code is zero, this mechanism still enables one to control the MPP clock according to the requirements of the particular MPP instruction.

Alternative Developments in the AP Communication Topology

A significant description of a processor design may be obtained by an examination of what communication lines exist between processing elements. In general, the more unstructured and flexible the communications topology, the more powerful (and, usually, more difficult to program) is the processing system thus described.

In the AP described herein, the principle communication link is a one way line from the COMP to every AM word-slice. Physically, this high data rate channel is comprised of parallel connections between each COMP bit and every bit in the corresponding AM bit-slice.

Communication is also possible between different sections (or syllables) of a word-slice, simultaneously for every word-slice in the AM. This intra-word slice communication is necessarily bit-serial see above Sections on the Addition and Multiplication of two syllables within every word so that the communication channel is of lower data rate, and hance of secondary importance, than the above.

There is, however, in the system presented thus far, no parallel communication between different word-slices in the AM. Stated differently, information can flow in parallel from the COMP to every point in AM, information can flow horizontally within the AM, but information cannot flow vertically within the AM. We note that a communications channel from a single word-slice to all other word-slices may be established by reading this word-slice into the AMOB and then gating the contents of the AMOB onto the COMP. However, it is not possible for information to flow simultaneously between many sets of AM word-slice.

A limited (i.e. low data rate) vertical information channel can be established by permitting each word-slice to communicate with the word-slice immediately above or below it. This may be accomplished as follows: From the point of view of AM word-slice it is irrelevant whether or not the COMP input (input 2 in FIG. 3) really comes from the COMP. This suggests that a new pair of external lines be used to select either the COMP, or the word-slice above, or the word-slice below, as the input in the present design comes only from the COMP. If the input selection is made according to the following vertical word-slice selection code

| Input word-slice | Control Line #1 | Control Line #2 |
|---|---|---|
| Comparand | 1 | 1 |
| Word-slice above | 1 | 0 |
| Word-slice below | 0 | 1 |

Figure 14:
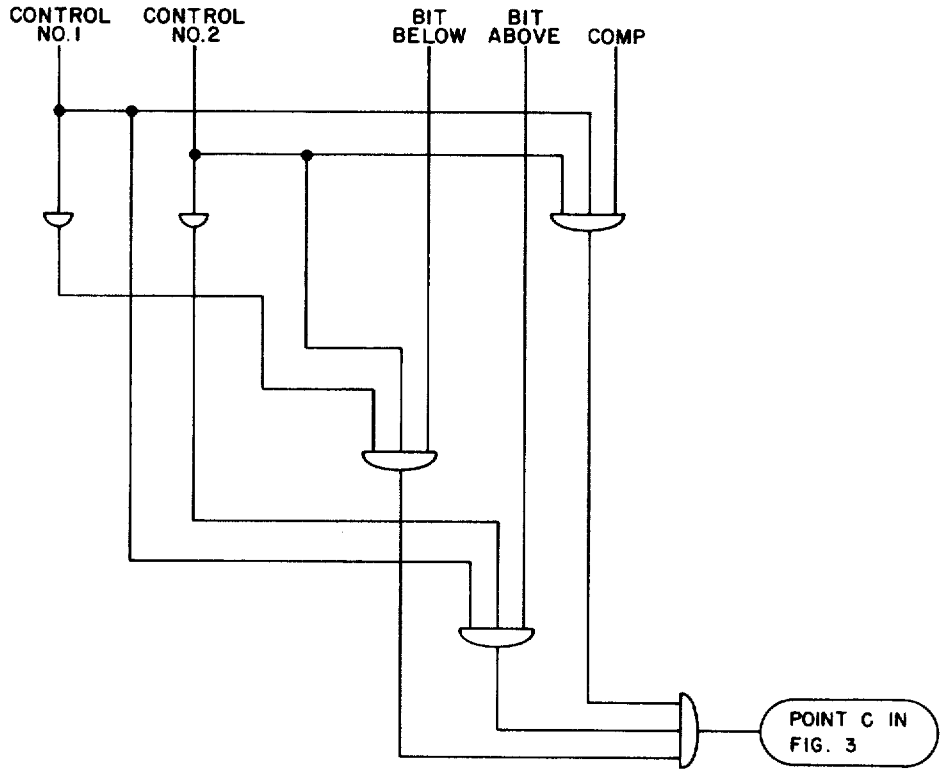
FIG. 14 illustrates a circuit for implementation of vertical information flow.

FIG. 14 shows how this vertical communications channel might be implemented.

As a result of this design change, every operation involving the COMP and selected word-slices may be performed with the same selected word-slices and the word-slice directly above or below (it is noted that the selection described by the verticle word-slice selection code is for the entire AM).

Stating the above differently, one might say that one has succeeded in imposing a one-dimensional vertical communication topology on a one-dimensional AM array. This additional capability may be used, for example, in statistical routines where differences between adjacent array elements are important, or in simulations of one-dimensional systems, where the behavior of any point (as described by a set of parameters stored within each word-slice is considered a function of the parameters of adjacent points.

This immediately suggests that a two-dimensional AM array be constructed by stacking a series of one-dimensional AM's and connecting them so that a "left-right" selection can be added to the "up-down" selection specified in the above vertical word-slice section code. Such a configuration would be useful in processing two-dimensional information (e.g. optical processing) as well as in the simulation of two-dimensional systems. Going one step further, one may add an additional degree of freedom by stacking a series of two-dimensional AM's and adding a "back-front" word-slice selection. Such a configuration would be ideal for the simulation of any three-dimensional system whose time development may be expressed as a combination of universal and "local" effects (universal effects may be introduced through the COMP). Potential applications include atmospheric studies, atomic reactor calculations, plasma simulations, etc. As in most AM operations described in previous sections, the simulation time will be independent of the number of points being simulated.

The additional gate and control line requirements for these various communication topologies are summarized as follows:

| Communication topology | Extra control lines | Gates required |
|---|---|---|
| One dimensional | 3N plus 2 | 6N |
| Two dimensional | 5N plus 3 | 9N |
| Three dimensional | 7N plus 3 | 11N |

The above modifications have been isolated from the basic system both because the additional capability is more of special-purpose application than other AP operations and because, in terms of present technologies, the additional gate and control line requirements are relatively expensive.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. A solid state, variable syllable, variable instruction, associative processor which comprises, a plurality of identical associative chip elements each containing an integral number of associative memory bits, a plurality of identical, vertically stacked associative processor words, said plurality of words determining any desired processor size, said words comprising a plurality of identical associative chip elements, each of said elements horizontally connected to adjacent chip elements, said plurality of horizontally connected chip elements determining any desired word size, a write bus for each word connected to each associative chip element of the word for controlling the writing of information into that word, an add bus for each word connected to each associative chip element of the word for controlling add functions within that word, a response store comprising a plurality of memory flip-flops, and for each processor word, said response store section connected to one end of its associated processor word and to the add bus and write bus of that word, said response store section simultaneously controlling each word in the parallel processing of data stored within each processor word, controlling various search operations performed simultaneously within each processor word, and stores the results of these search operations, a plurality of control flip-flop registers equal in width to the combined width of the processor word and the response store, each bit of each of said registers connected in parallel to the corresponding bit in every processor word and its response store section, said control registers defining syllable limits to be observed in any operation, specifying which syllables will participate in the various search, logical, write, multi-write, and multi-add operations, specifying the type of search for each syllable when a search operation is performed, receives data outputs from any processor word, receives data from and provides data to any device which may be using the processor, and provides data inputs to the processor, said data inputs are compared in one step and under various criteria specified by the control registers to data stored within every processor word, the results of said comparisons being stored in the response store, whereby said data inputs are in one step written into one or more processor words or portions of one or more processor words, and in one step combined with data in one or more processor words in arithmetic and logical operations, the results of said operations being stored within the processor words, and said read, write, multi-write, add, multi-add, and logical operations are each performed in only one step and combinations of said operations performed simultaneously.

* * * * *